(12) United States Patent
Lee

(10) Patent No.: US 12,075,044 B2
(45) Date of Patent: Aug. 27, 2024

(54) VIDEO SIGNAL ENCODING/DECODING METHOD, AND DEVICE THEREFOR

(71) Applicant: XRIS CORPORATION, Seongnam-si (KR)

(72) Inventor: Bae Keun Lee, Seongnam-si (KR)

(73) Assignee: XRIS CORPORATION, Seongnam-si (KR)

( * ) Notice: Subject to any disclaimer, the term of this patent is extended or adjusted under 35 U.S.C. 154(b) by 118 days.

(21) Appl. No.: 17/463,452

(22) Filed: Aug. 31, 2021

(65) Prior Publication Data

US 2021/0392326 A1 Dec. 16, 2021

Related U.S. Application Data

(63) Continuation of application No. 17/094,619, filed on Nov. 10, 2020, now Pat. No. 11,140,391, which is a (Continued)

(30) Foreign Application Priority Data

Dec. 21, 2018 (KR) .......................... 10-2018-0167969
Dec. 21, 2018 (KR) .......................... 10-2018-0167972

(51) Int. Cl.
*H04N 19/119* (2014.01)
*H04N 19/105* (2014.01)
(Continued)

(52) U.S. Cl.
CPC ......... *H04N 19/119* (2014.11); *H04N 19/105* (2014.11); *H04N 19/176* (2014.11); *H04N 19/44* (2014.11); *H04N 19/51* (2014.11)

(58) Field of Classification Search
CPC ............... H04N 19/105; H04N 19/119; H04N 19/176; H04N 19/44; H04N 19/51; H04N 19/52; H04N 19/54; H04N 19/573
See application file for complete search history.

(56) References Cited

U.S. PATENT DOCUMENTS 9,036,709 B1 * 5/2015 Kim .................... H04N 19/129
375/240.03
10,715,827 B2 7/2020 Hsu
(Continued)

FOREIGN PATENT DOCUMENTS

KR 10-2018-0065953 A 6/2018
KR 10-2018-0087880 A 8/2018
(Continued)

OTHER PUBLICATIONS

A communication from the corresponding Chinese Patent Application No. 201980037808.8 issued on Sep. 20, 2023.

*Primary Examiner* — Anner N Holder
(74) *Attorney, Agent, or Firm* — Goldilocks Zone IP Law

(57) ABSTRACT

A video decoding method according to the present invention may comprise: a step for dividing a coding block into a first partition and a second partition; a step for deriving a merge candidate list for the coding block; a step for determining a first merge candidate and a second merge candidate by using the merge candidate list; a step for deriving a first prediction sample and a second prediction sample on the basis of first motion information on the first merge candidate and second motion information on the second merge candidate; and a step for obtaining a third prediction sample for the coding block on the basis of the first prediction sample and the second prediction sample.

13 Claims, 18 Drawing Sheets

Related U.S. Application Data continuation of application No. PCT/KR2019/018220, filed on Dec. 20, 2019.

(51) Int. Cl.
*H04N 19/176* (2014.01)
*H04N 19/44* (2014.01)
*H04N 19/51* (2014.01)

(56) References Cited

U.S. PATENT DOCUMENTS

| | | |
|---|---|---|
| 10,750,190 B2 | 8/2020 | Seo et al. |
| 2011/0007799 A1 | 1/2011 | Karczewicz et al. |
| 2012/0257678 A1* | 10/2012 | Zhou ............... H04N 19/176 375/E7.243 |
| 2012/0320984 A1 | 12/2012 | Zhou |
| 2013/0195188 A1 | 8/2013 | Sugio et al. |
| 2014/0092970 A1 | 4/2014 | Misra |
| 2014/0321547 A1 | 9/2014 | Takehara et al. |
| 2014/0307784 A1 | 10/2014 | Lee et al. |
| 2014/0253681 A1 | 11/2014 | Zhang et al. |
| 2014/0376638 A1 | 12/2014 | Nakamura et al. |
| 2015/0085930 A1 | 3/2015 | Zhang et al. |
| 2015/0103897 A1 | 4/2015 | Kim et al. |
| 2015/0139317 A1 | 5/2015 | Lee et al. |
| 2015/0271516 A1* | 9/2015 | Arimura ............... H04N 19/176 375/240.16 |
| 2015/0334411 A1 | 11/2015 | Yamamoto et al. |
| 2018/0109805 A1* | 4/2018 | Takehara ............. H04N 19/577 |
| 2018/0184110 A1 | 6/2018 | Panusopone et al. |
| 2018/0199054 A1 | 7/2018 | Hsu |
| 2019/0052886 A1 | 2/2019 | Chiang et al. |
| 2019/0110045 A1 | 4/2019 | Zhao et al. |
| 2020/0045306 A1* | 2/2020 | Lee ....................... H04N 19/513 |
| 2020/0053364 A1 | 2/2020 | Seo et al. |
| 2020/0059642 A1* | 2/2020 | Kang .................... H04N 19/70 |
| 2020/0059660 A1 | 2/2020 | Kim et al. |
| 2020/0077089 A1 | 3/2020 | Lee |
| 2020/0267408 A1 | 8/2020 | Lee et al. |
| 2020/0382790 A1 | 12/2020 | Chen et al. |
| 2021/0021861 A1* | 1/2021 | Lee ....................... H04N 19/521 |
| 2021/0037256 A1* | 2/2021 | Zhang ................. H04N 19/109 |
| 2021/0250605 A1* | 8/2021 | Lee ....................... H04N 19/105 |
| 2022/0038682 A1* | 2/2022 | Lim ..................... H04N 19/105 |
| 2022/0070456 A1* | 3/2022 | Chiang ............... H04N 19/119 |

FOREIGN PATENT DOCUMENTS

| | | |
|---|---|---|
| KR | 10-2018-0109816 A | 10/2018 |
| WO | 2018/070632 A1 | 4/2018 |
| WO | WO2018/106047 A1 | 6/2018 |

\* cited by examiner

【FIG. 1】
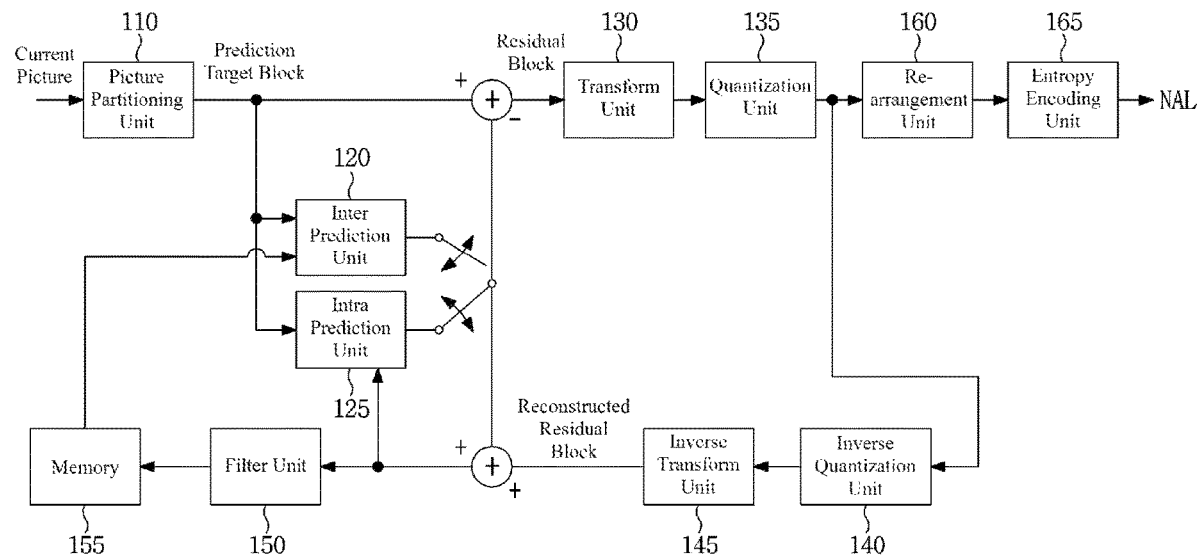
【FIG. 2】
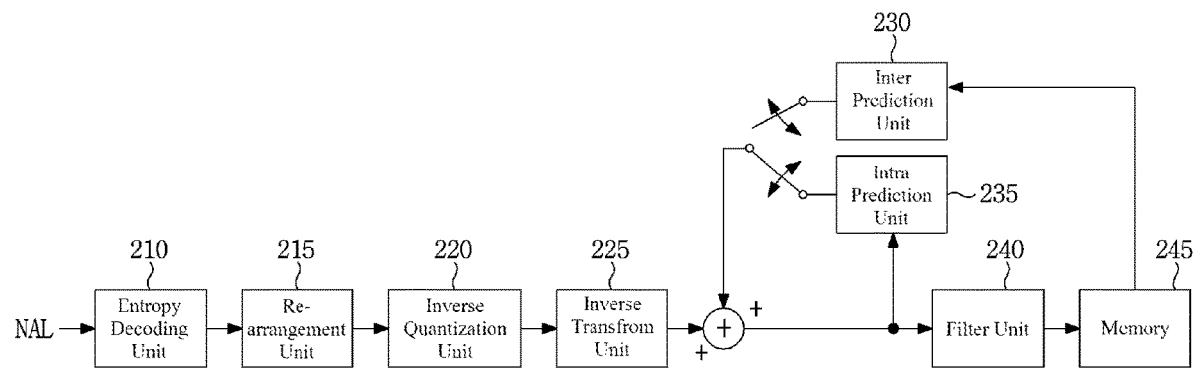
【FIG. 3】
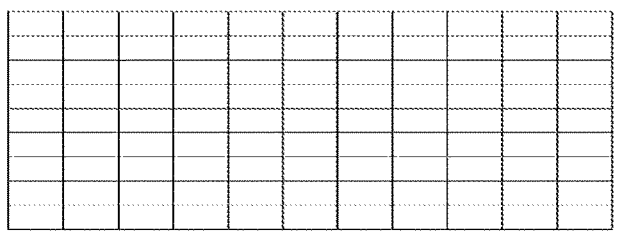

[FIG. 4]
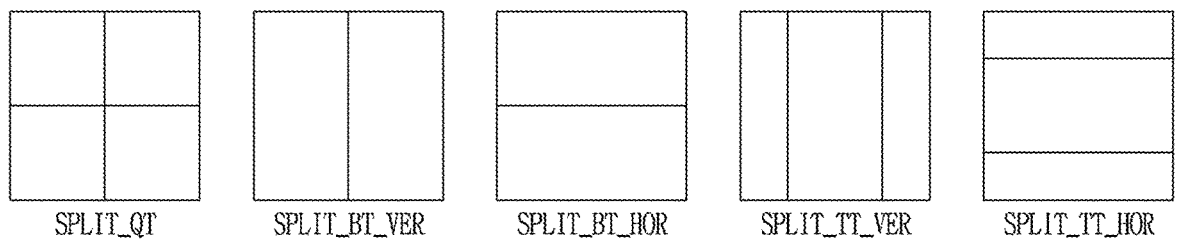
[FIG. 5]
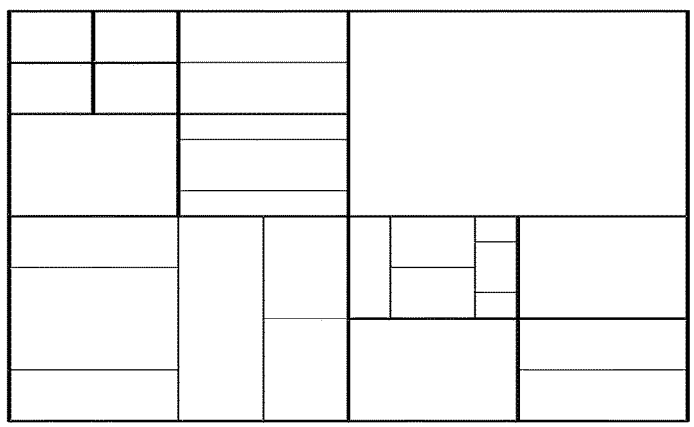
[FIG. 6]
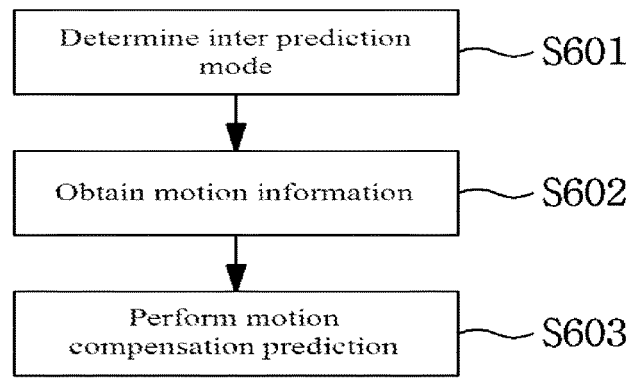

[FIG. 7]
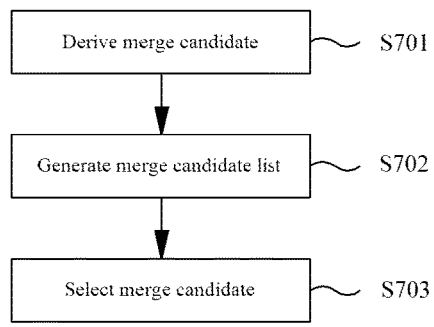
[FIG. 8]
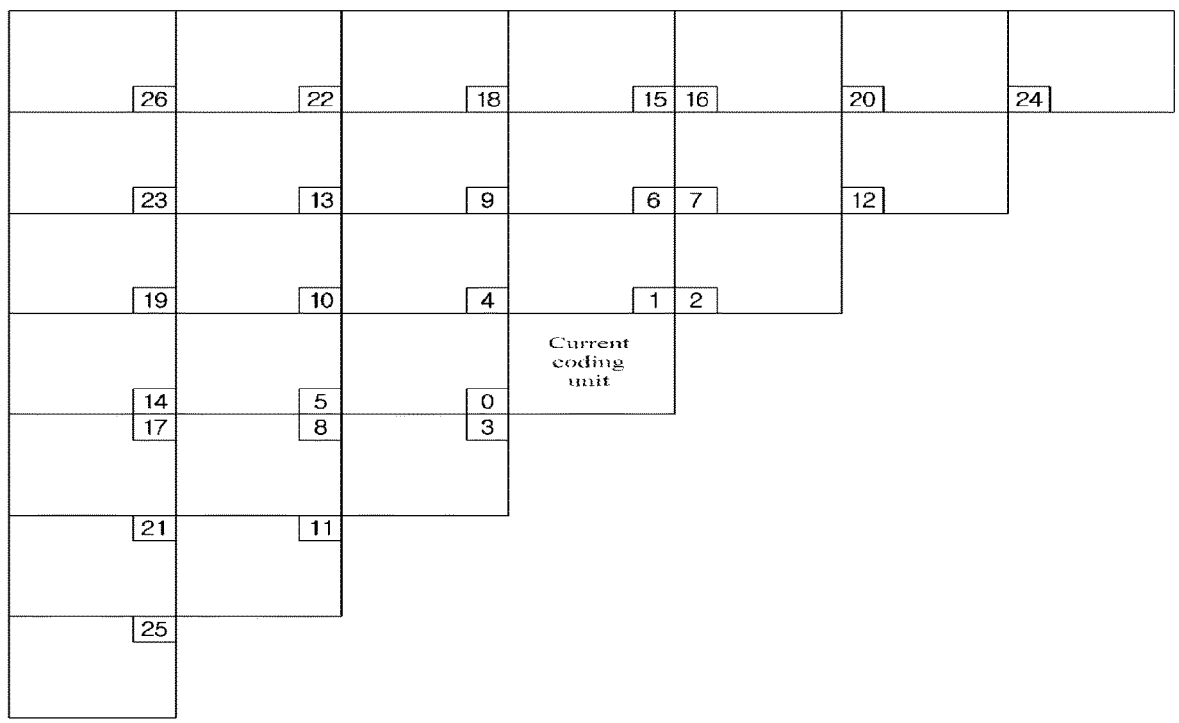

【FIG. 9】
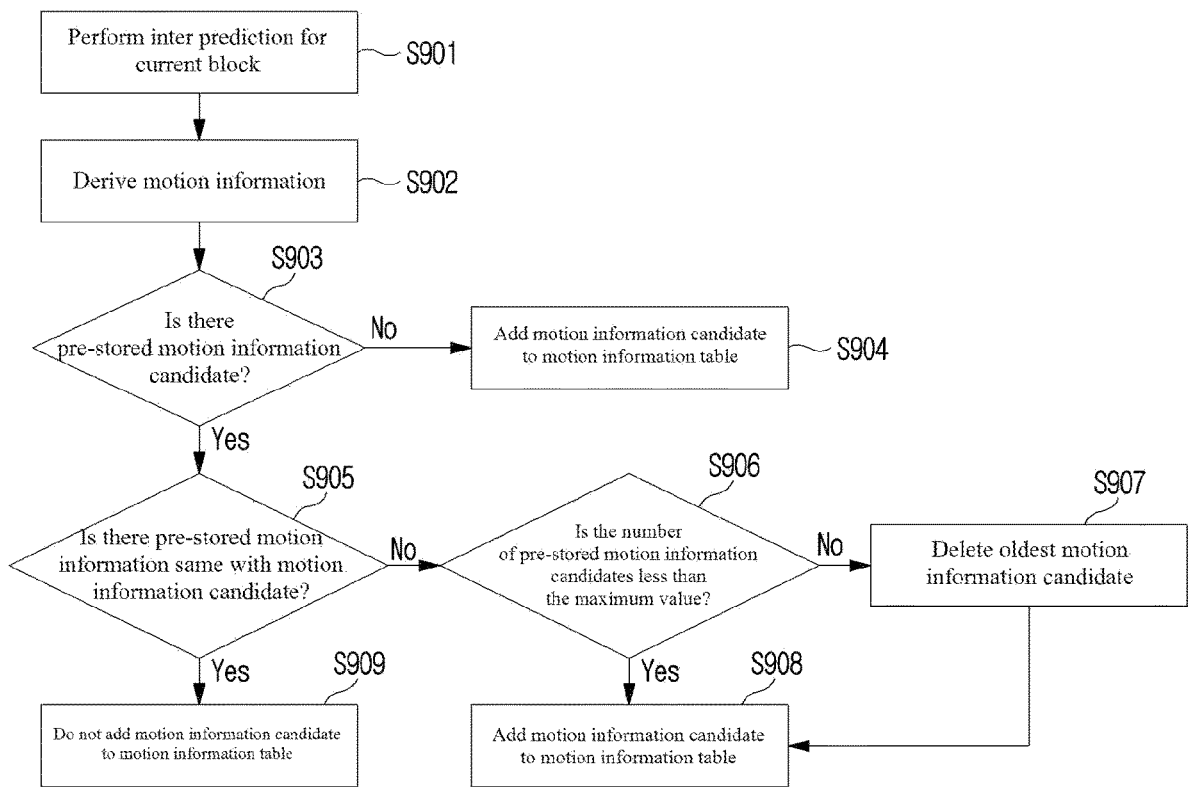
【FIG. 10】
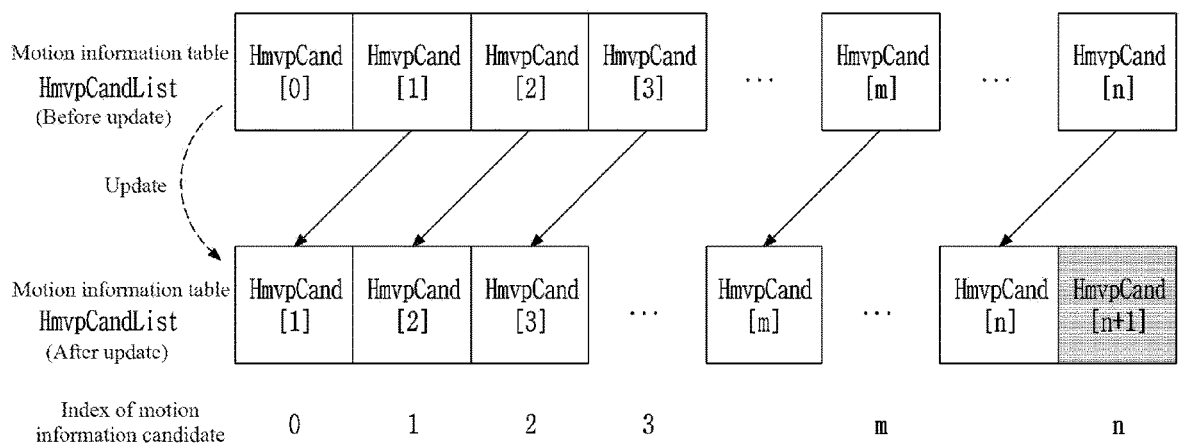

[FIG. 11]
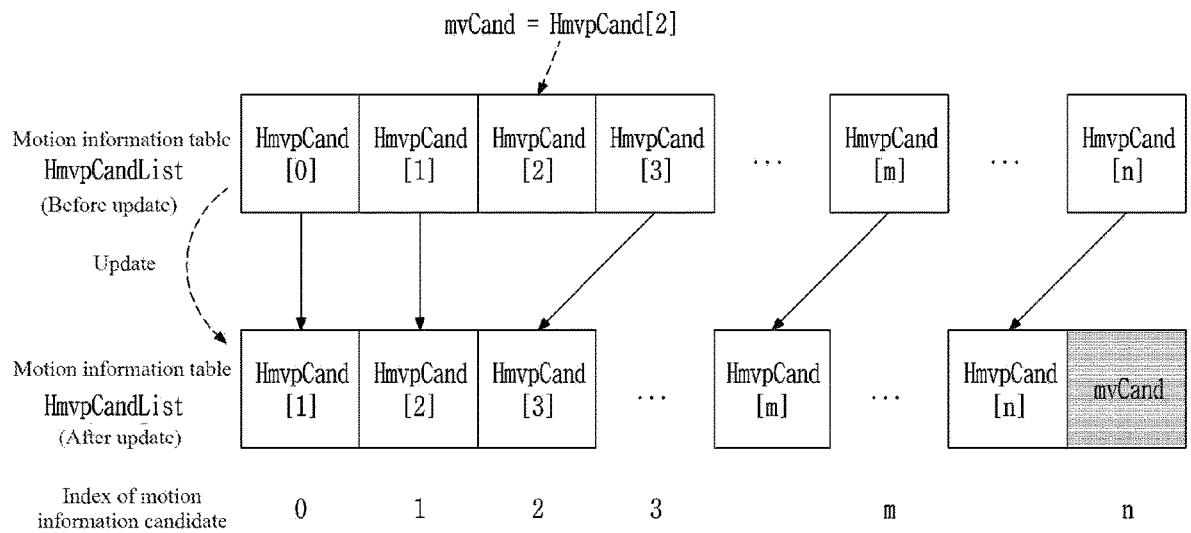
[FIG. 12]
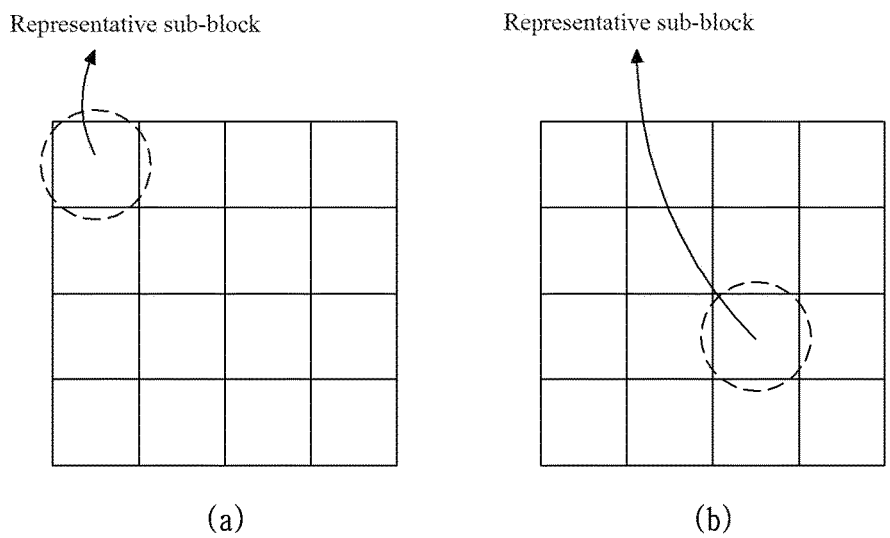
(a) (b)

[FIG. 13]
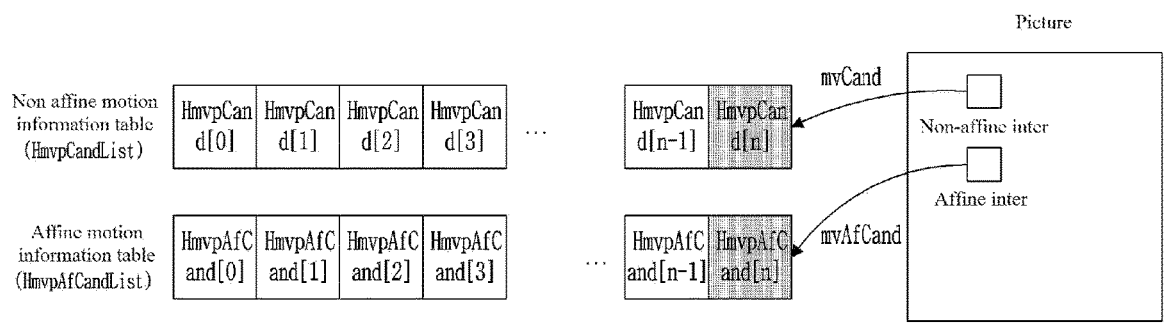
[FIG. 14]
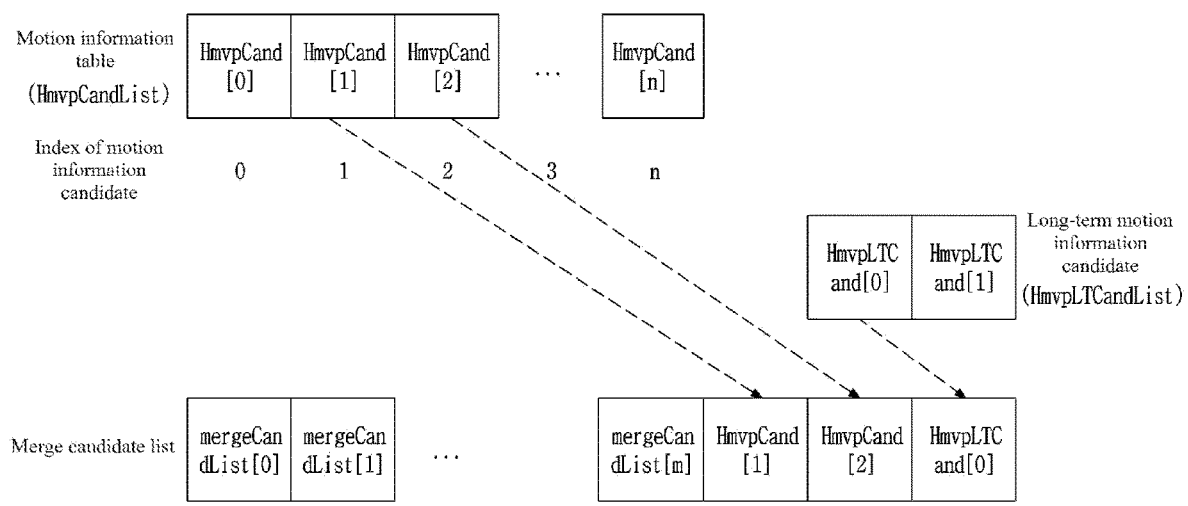

[FIG. 15]
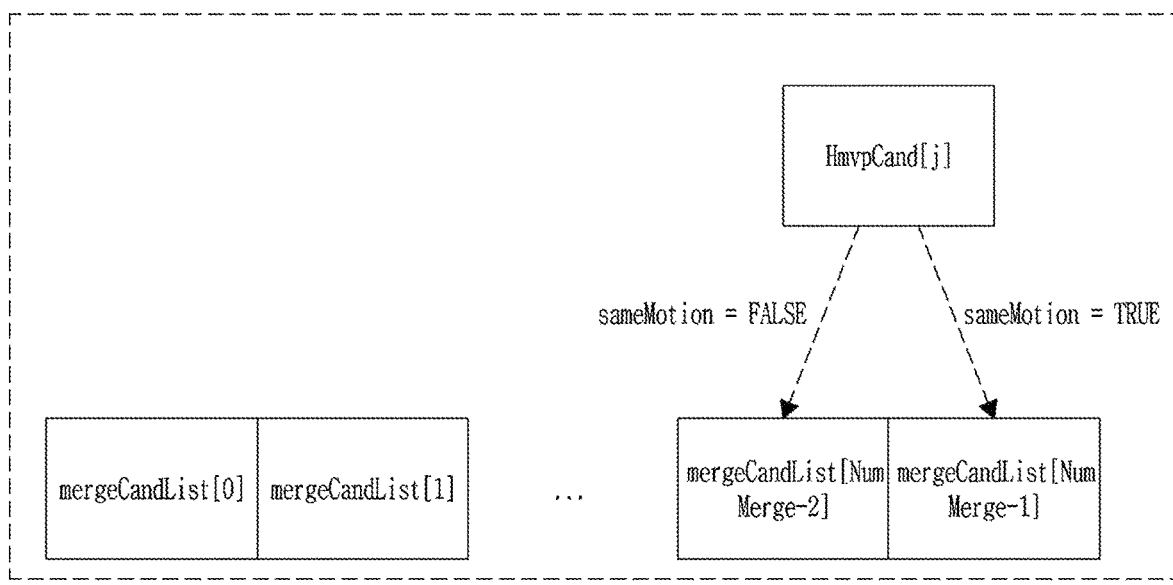

[FIG. 16]
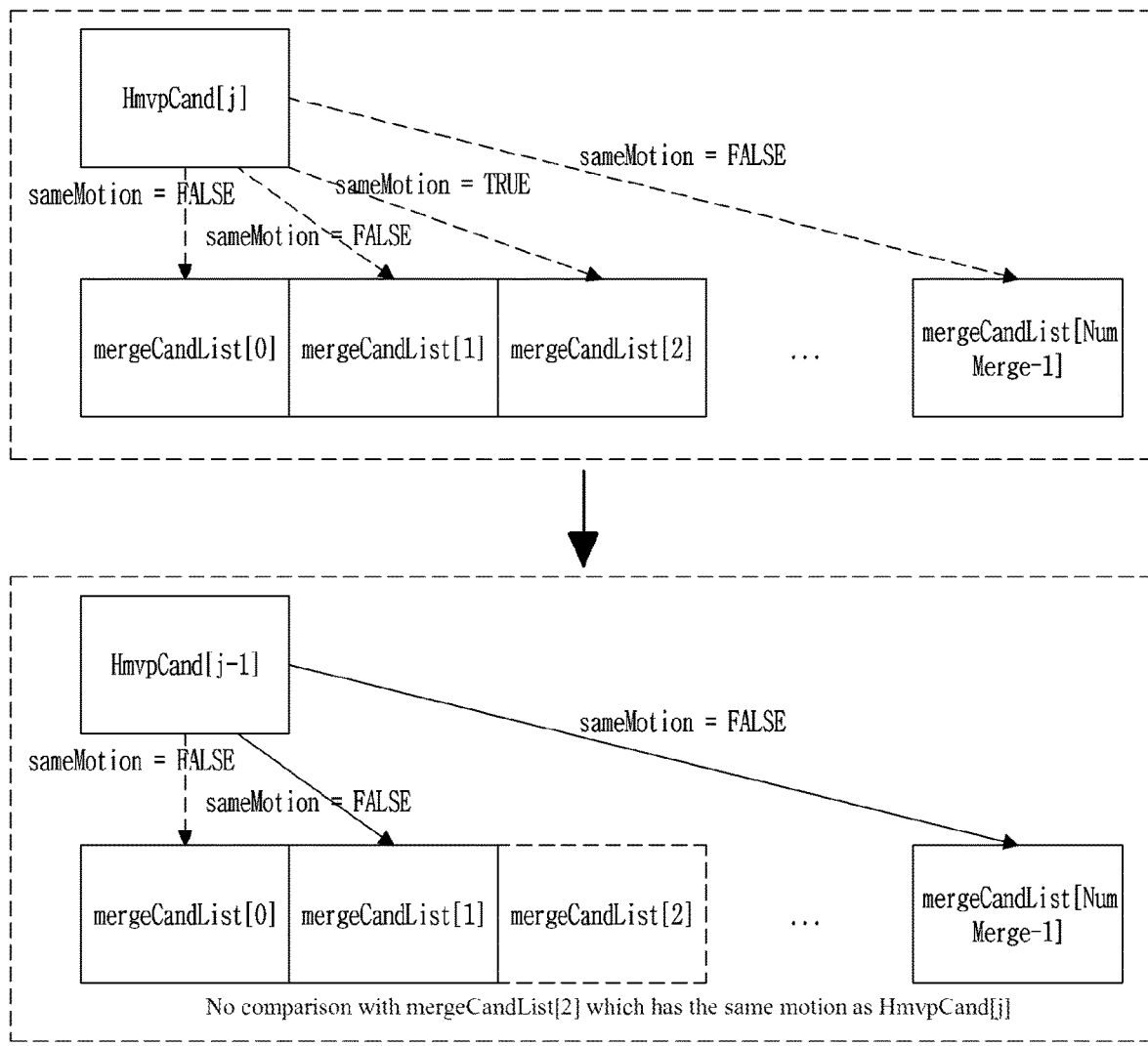

[FIG. 17]
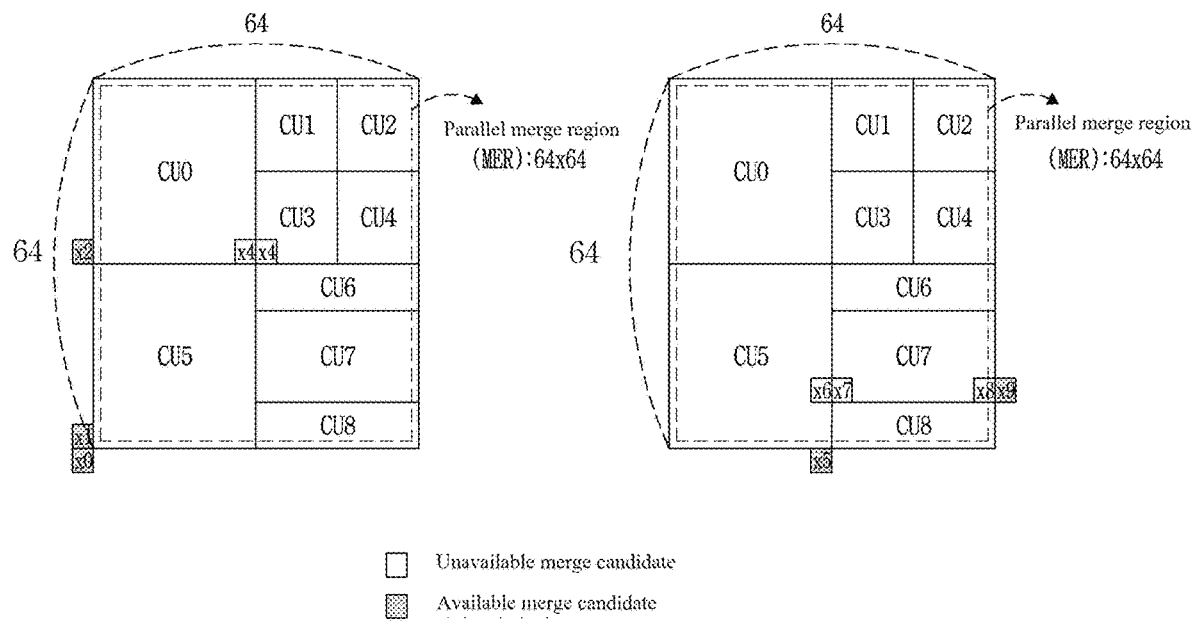
[FIG. 18]
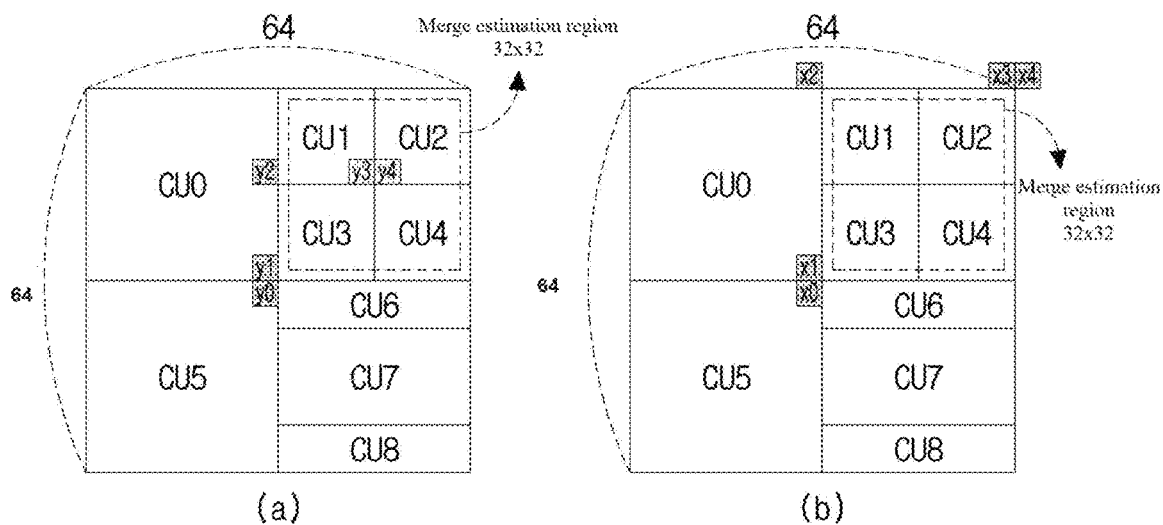
(a)           (b)

[FIG. 19]
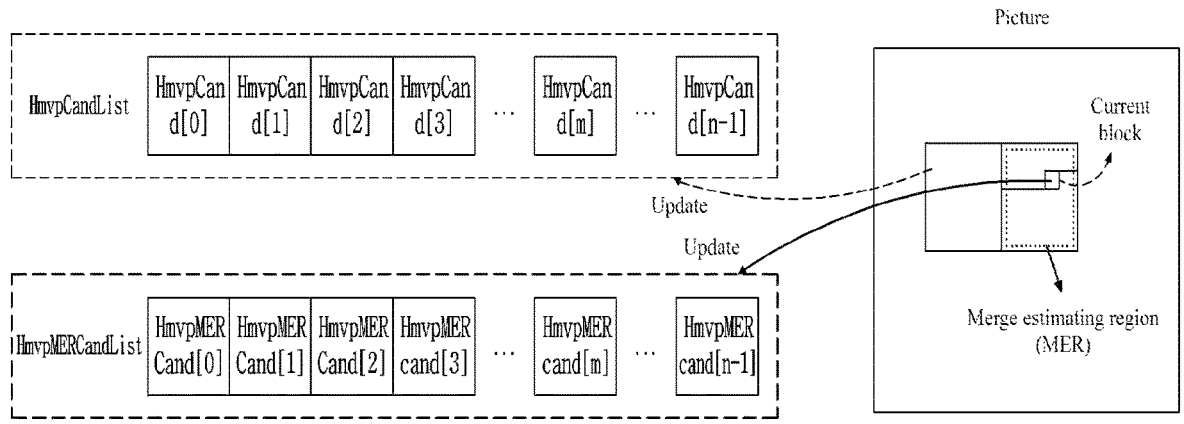
[FIG. 20]
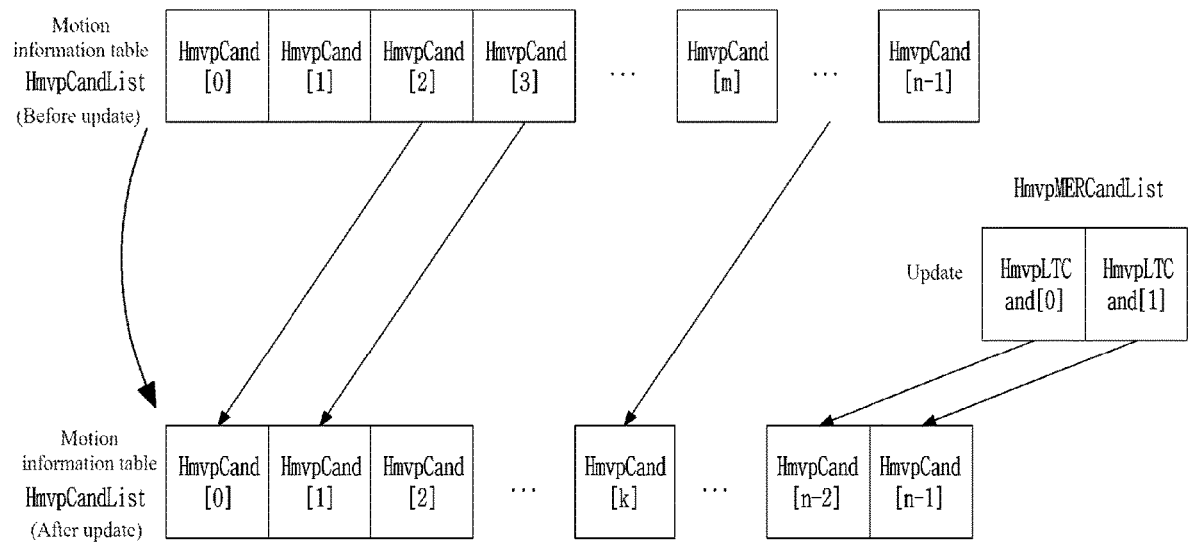
[FIG. 21]
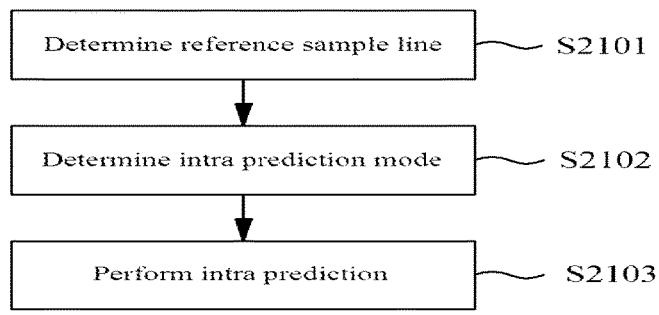

[FIG. 22]
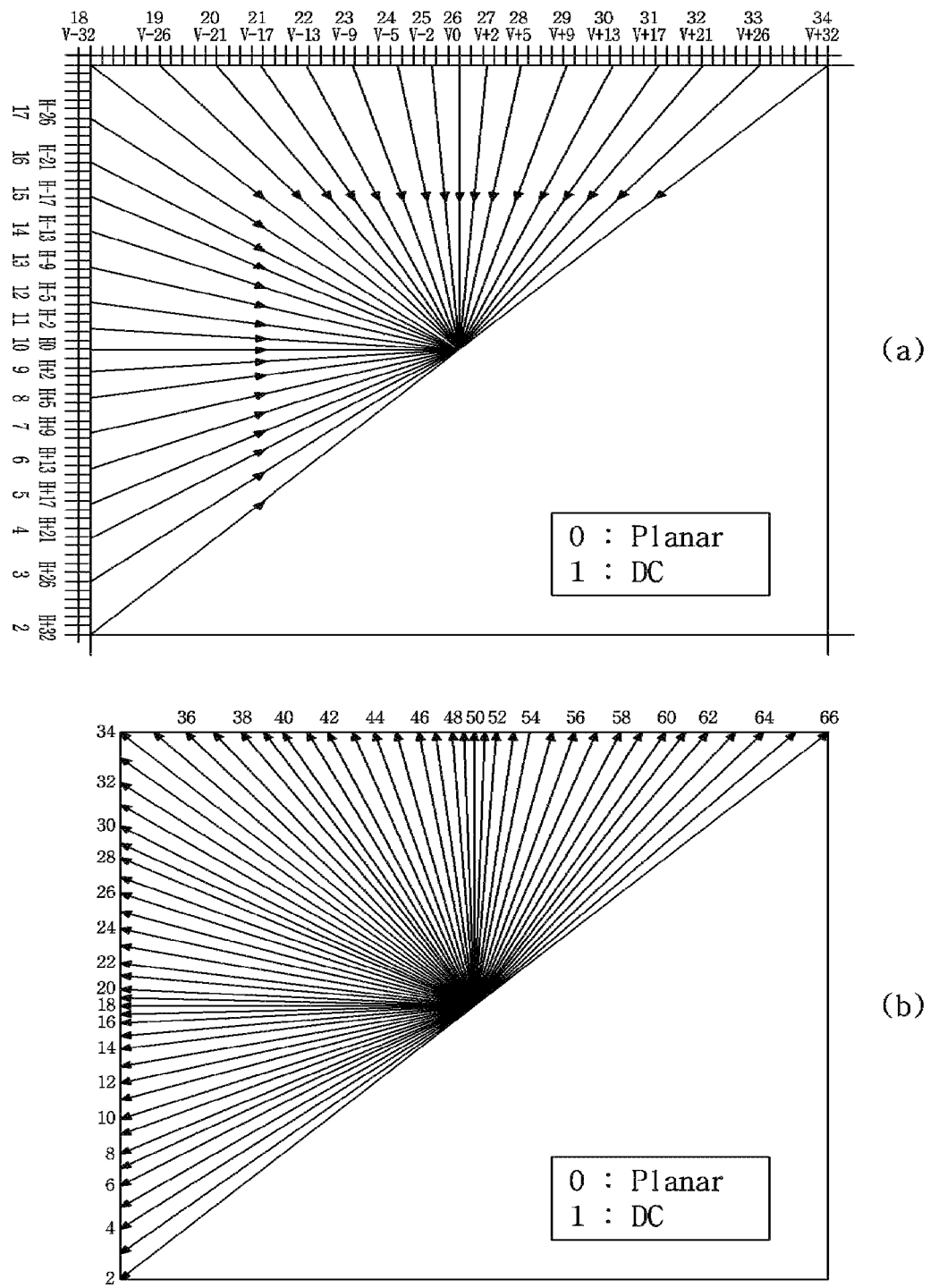

【FIG. 23】
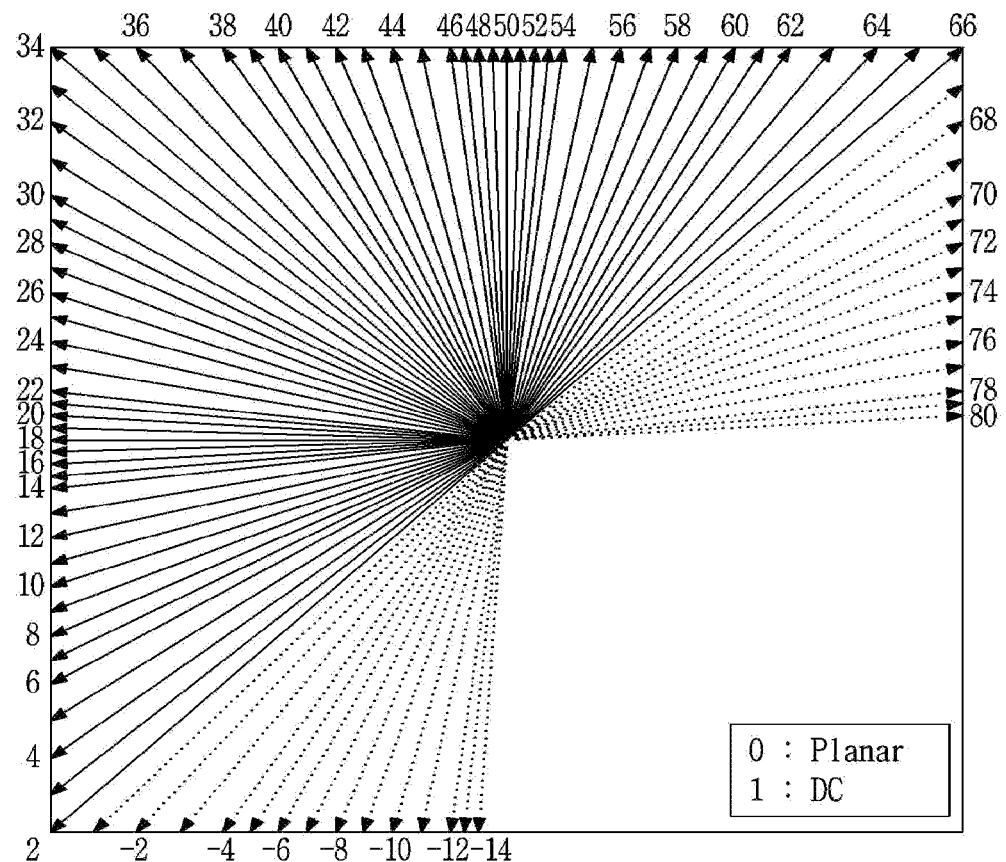
【FIG. 24】
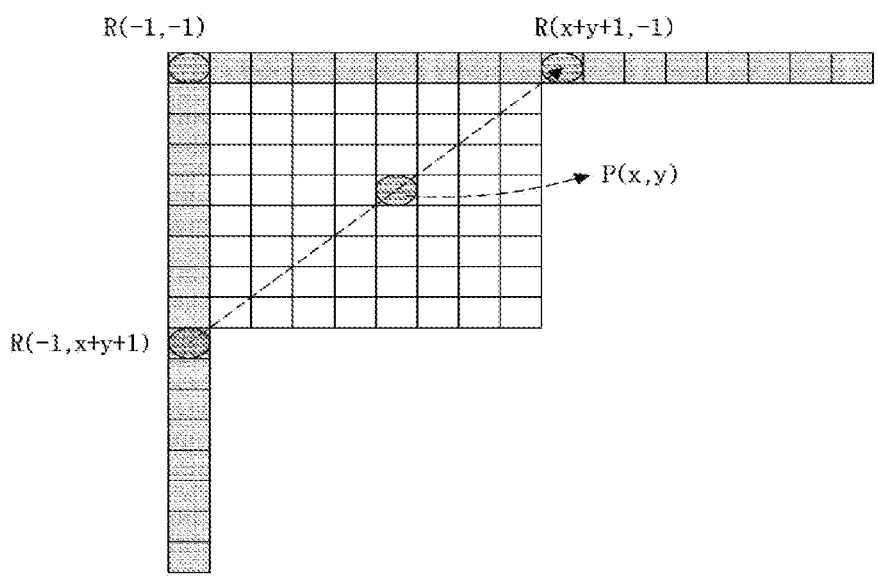

[FIG. 25]

| First sub-block weight = 2 | Second sub-block weight = 3 |
|---|---|
| Third sub block weight = 5 | Fourth sub-block weight = 6 |

(a)

| First sub-block weight = 3 | Second sub-block weight = 4 |
|---|---|
| Third sub block weight = 6 | Fourth sub-block weight = 8 |

| First sub-block weight = 2 | Second sub-block weight = 3 |
|---|---|
| Third sub-block weight = 5 | Fourth sub-block weight = 6 |

Uni prediction CU (a)

| First sub-block weight = 3 | Second sub-block weight = 4 |
|---|---|
| Third sub-block weight = 6 | Fourth sub-block weight = 7 |

Bi prediction CU (b)

【FIG. 27】
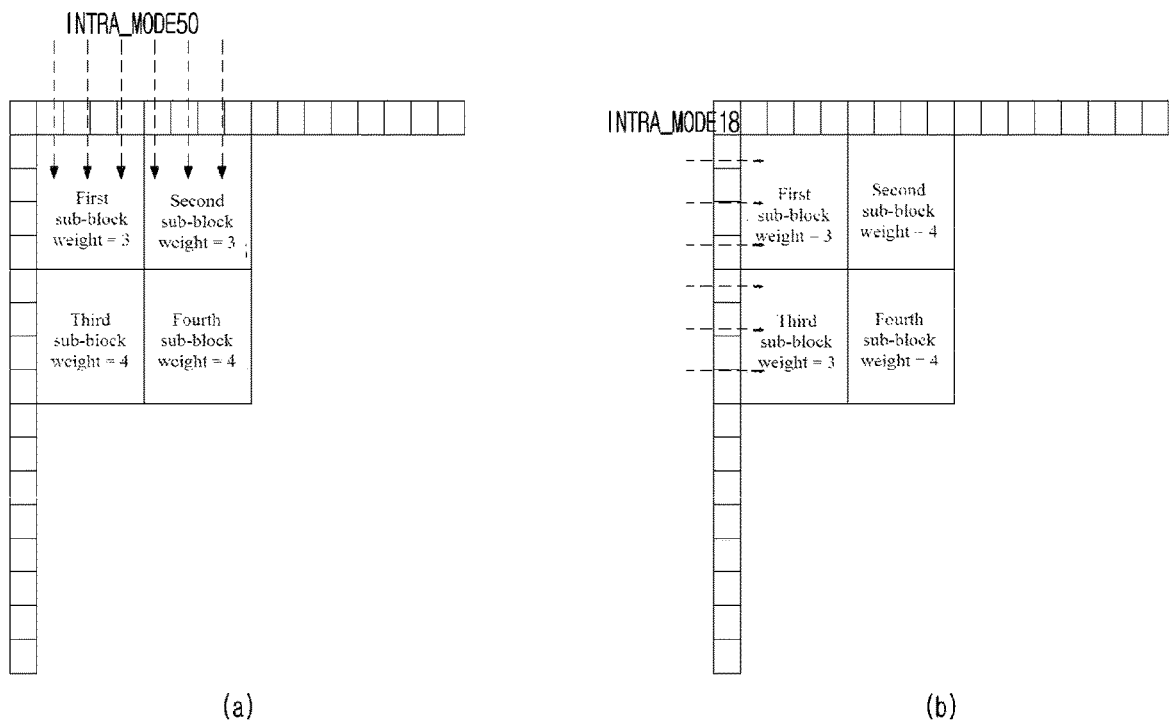
(a)   (b)
【FIG. 28】
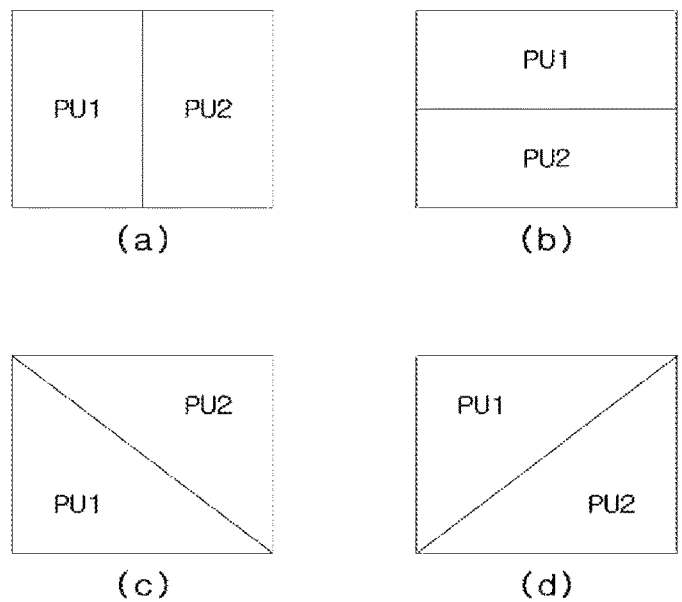

[FIG. 29]
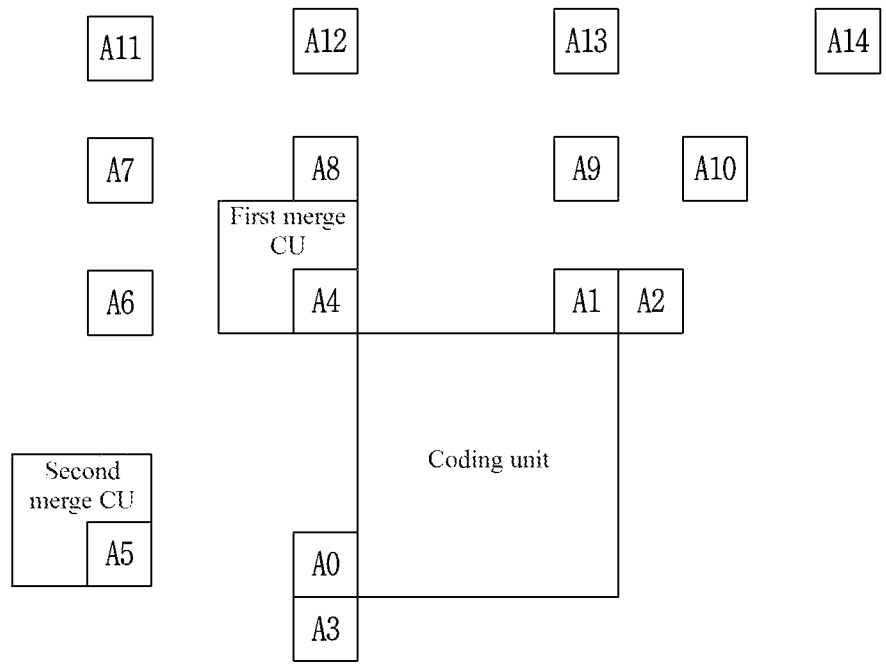
[FIG. 30]
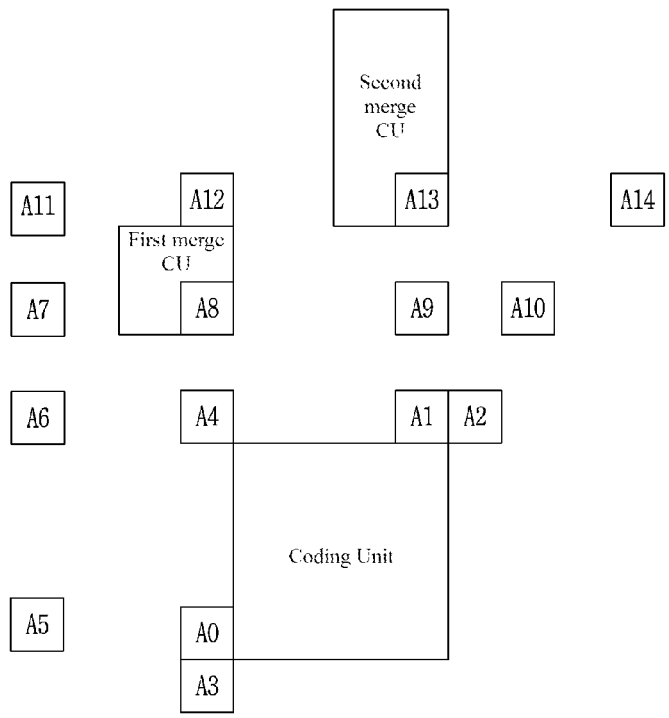

[FIG. 31]
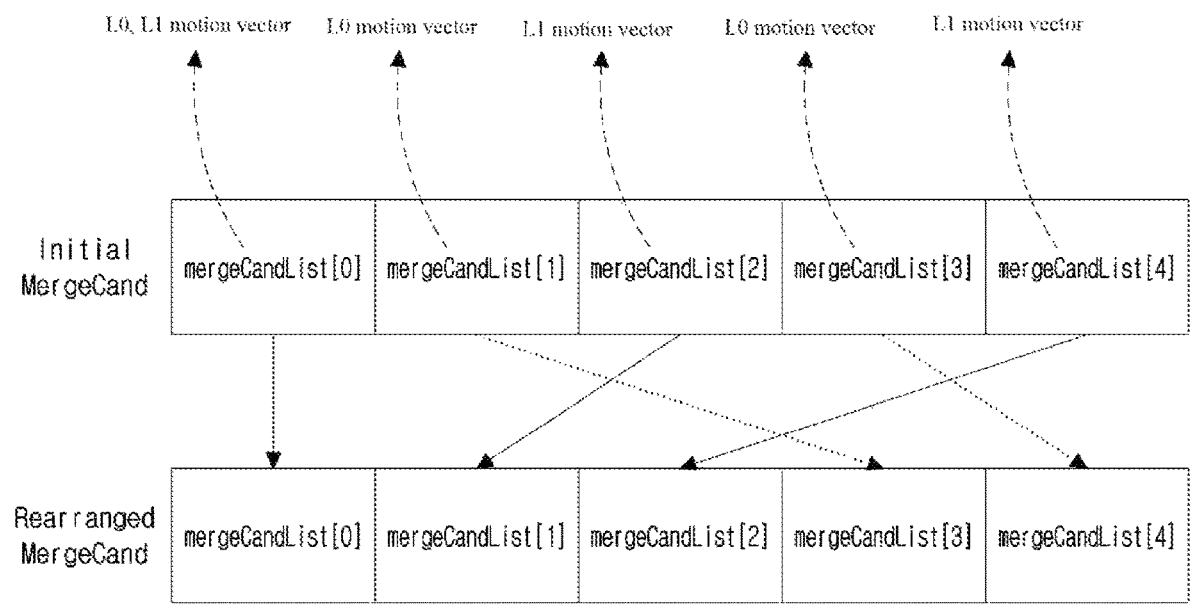

[FIG. 32]
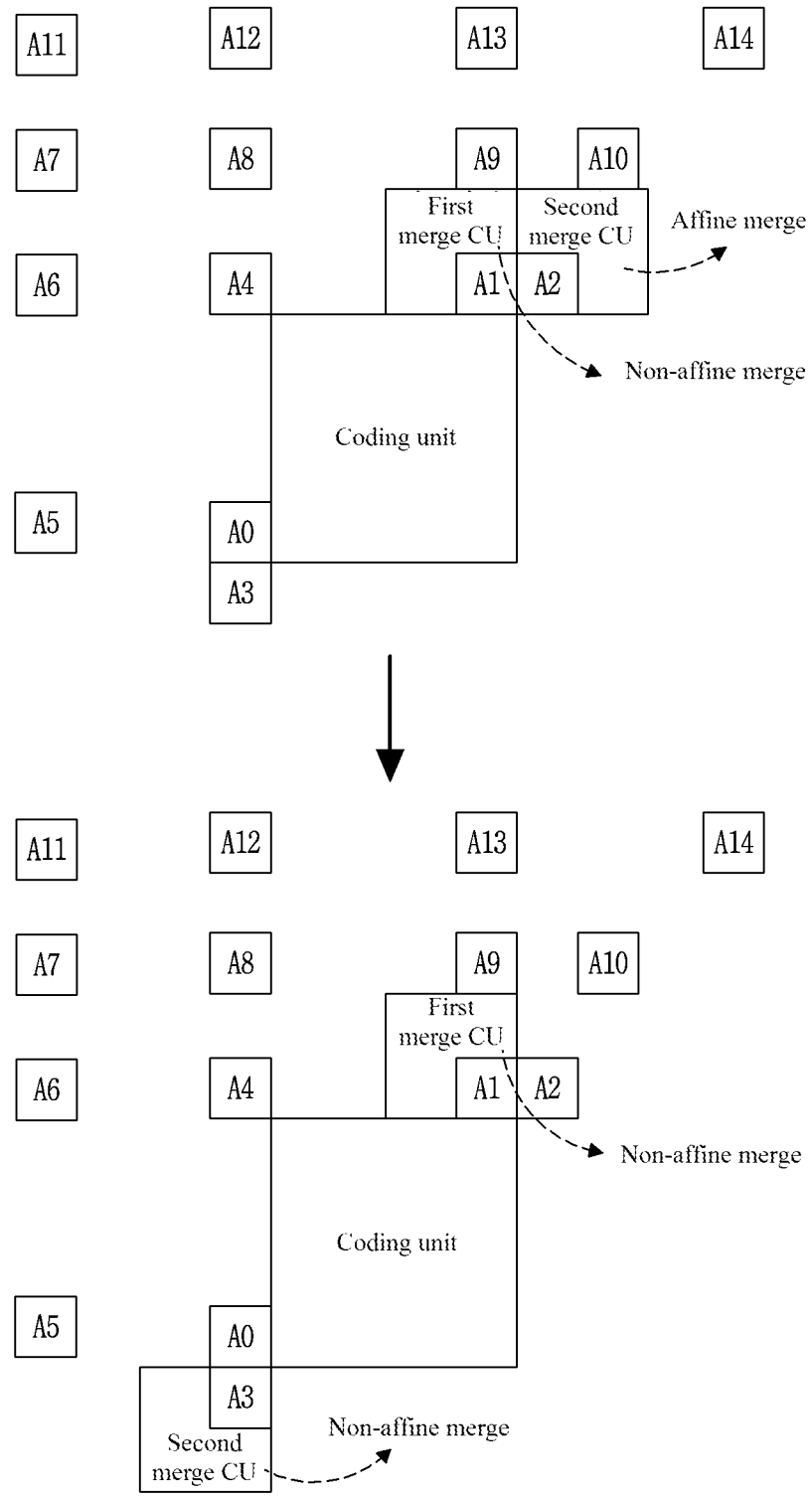

【FIG. 33】
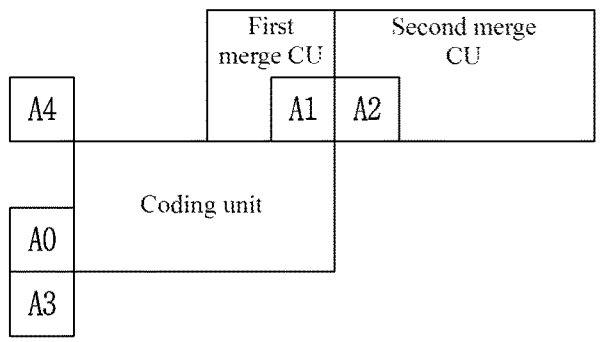
【FIG. 34】
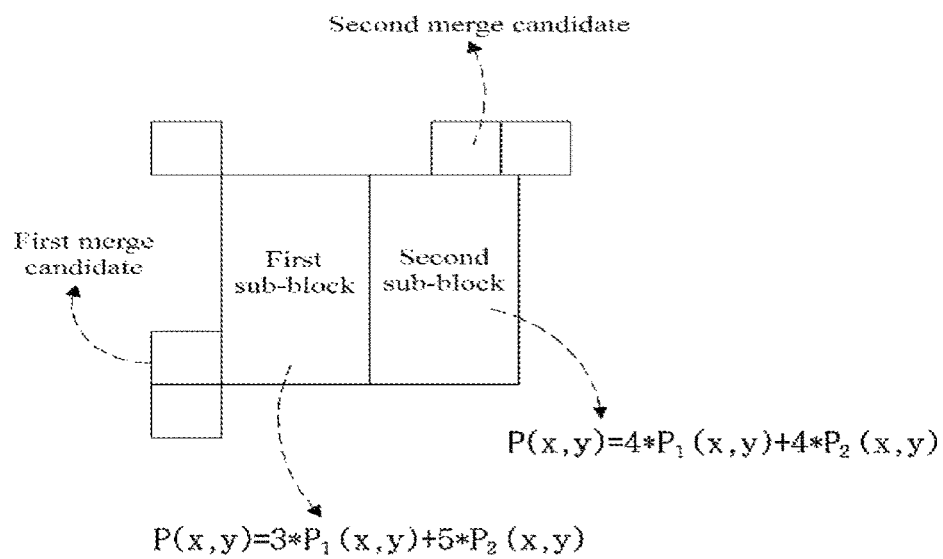
【FIG. 35】
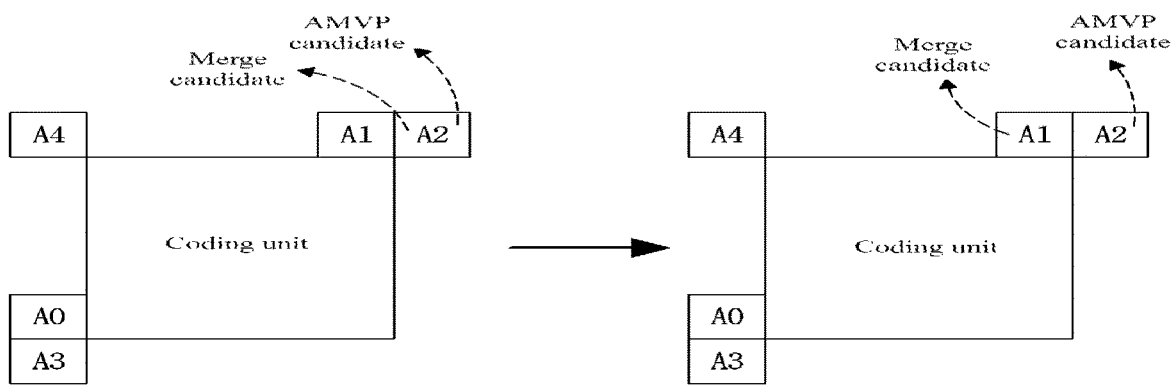

VIDEO SIGNAL ENCODING/DECODING METHOD, AND DEVICE THEREFOR

CROSS-REFERENCE TO RELATED PATENT APPLICATIONS

The present application is a continuation application of application Ser. No. 17/094,619, filed Nov. 10, 2020, which is a continuation of PCT International Application No.: PCT/KR2019/018220, filed on Dec. 20, 2019, which claims foreign priority to Korean Patent Application No.: 10-2018-0167972, filed on Dec. 21, 2018 and Korean Patent Application No.: 10-2018-0167969, filed on Dec. 21, 2018, the disclosures of which are hereby incorporated by the references in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Purpose

A purpose of the present disclosure is to provide a combined prediction method combining a plurality of prediction methods in encoding/decoding a video signal, and a device for performing the method.

A purpose of the present disclosure is to provide a method for partitioning a coding block into a plurality of prediction units in encoding/decoding a video signal, and a device for performing the method.

A purpose of the present disclosure is to provide a method for obtaining a prediction sample with a plurality of merge candidates in encoding/decoding a video signal, and a device for performing the method.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

A video signal decoding/encoding method according to the present disclosure may include partitioning a coding block into a first partition and a second partition; deriving a merge candidate list on the coding block; determining a first merge candidate and a second merge candidate by using the merge candidate list; deriving a first prediction sample and a second prediction sample based on first motion information of the first merge candidate and second motion information of the second merge candidate; and obtaining a third prediction sample on the coding block based on the first prediction sample and the second prediction sample. In this connection, the third prediction sample may be obtained based on a weighted sum operation of the first prediction sample and the second prediction sample and a weight applied to the first prediction sample and the second prediction sample may be different between when the third prediction sample is included in the first partition and when the third prediction sample is included in the second partition.

In a video signal decoding/encoding method according to the present disclosure, a partitioning line partitioning the coding block into the first partition and the second partition may be at least one of a vertical line, a horizontal line or a diagonal line.

A video signal decoding/encoding method according to the present disclosure may include decoding first index information for specifying the first merge candidate and second index information for specifying the second merge candidate from bitstream. In this connection, when a value of the second index information is equal to or greater than that of the first index information, the second merge candidate may have a value adding 1 to a value of the second index information as an index.

In the video signal decoding/encoding method according to the present disclosure, the second merge candidate may be derived by adding or subtracting an offset to or from an index of the first merge candidate.

In the video signal decoding/encoding method according to the present disclosure, a number of merge candidates included in the merge candidate list may be below a predefined number.

In the video signal decoding/encoding method according to the present disclosure, when the third prediction sample is included in the above first partition, a weight applied to the first prediction sample may be set larger than a weight applied to the second prediction sample and when the third prediction sample is included in the second partition, a weight applied to the above second prediction sample may be set to be larger than a weight applied to the first prediction sample.

It is to be understood that the foregoing summarized features are exemplary aspects of the following detailed description of the present disclosure without limiting the scope of the present disclosure.

Technical Effect

According to the present disclosure, the combined prediction method combining a plurality of prediction methods may be provided to improve inter-prediction efficiency.

According to the present disclosure, a method partitioning a coding block into a plurality of prediction blocks and deriving the motion information of each prediction block may be provided to improve inter-prediction efficiency.

According to the present disclosure, a method obtaining a prediction sample by using a plurality of merge candidates may be provided to improve inter-prediction efficiency.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a flow diagram of an inter prediction method according to an embodiment of the present disclosure.

FIG. 7 is a flow diagram of a process deriving the current block motion information under a merge mode.

FIG. 8 is a diagram of illustrating candidate blocks used to derive a merge candidate.

FIG. 9 is a diagram to explain the update aspect of a motion information table.

FIG. 10 is a diagram showing the update aspect of a motion information table.

FIG. 11 is a diagram showing an example in which the index of a saved motion information candidate is renewed.

FIG. 12 is a diagram showing the position of a representative sub-block.

FIG. 13 shows an example in which a motion information table is generated per inter-prediction mode.

FIG. 14 is a diagram showing an example in which a motion information candidate included in a long-term motion information table is added to a merge candidate list.

FIG. 15 is a diagram showing an example in which a redundancy check is performed only for a part of merge candidates.

FIG. 16 is a diagram showing an example in which a redundancy check with a specific merge candidate is omitted.

FIG. 17 is a diagram showing an example in which a candidate block included in the same merge processing region as a current block is set to be unavailable as a merge candidate.

FIG. 18 is a diagram showing an example deriving a merge candidate for a current block when a current block is included in a merge processing region.

FIG. 19 is a diagram showing a temporary motion information table.

FIG. 20 is a diagram showing an example in which a motion information table and a temporary motion information table are unified.

FIG. 21 is a flow diagram of an intra-prediction method according to the embodiment of the present disclosure.

FIG. 22 is a diagram showing intra-prediction modes.

FIG. 23 is a diagram showing wide angle intra-prediction modes.

FIG. 24 is a diagram showing the application aspect of PDPC.

FIG. 25 is a diagram showing the application aspect of a weight.

FIG. 26 shows an example in which a different weight is assigned to a sub-block according to whether a merge candidate has bidirectional motion information or not.

FIG. 27 shows an example in which a different weight is assigned to a sub-block according to the intra prediction mode of a current block.

FIG. 28 is a diagram showing an example in which a current block is partitioned into a plurality of sub-partitions.

FIG. 29 shows an example in which the second merge candidate is specified considering the search order of candidate blocks.

FIG. 30 shows an example in which the first merge candidate and the second merge candidate are selected among merge candidates derived from non-neighboring blocks.

FIG. 31 is a diagram showing an example in which a merge candidate is rearranged.

FIG. 32 is a diagram to explain an example determining the second merge candidate.

FIG. 33 is a diagram showing an example in which weights applied to prediction blocks are determined based on the shape of candidate blocks.

FIG. 34 is a diagram showing an example in which a weight applied to prediction blocks is set differently per sub-partition.

FIG. 35 is a diagram showing an example in which a merge candidate is replaced.

DETAILED DESCRIPTION OF THE DISCLOSURE

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group.

Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (*a*)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4 (*b*) is a view showing a result of vertical directional binary-tree partitioning, and "SPLIT_BT_HOR" of FIG. 4 (*c*) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (d) is a view showing a result of vertical directional ternary-tree partitioning, and "SPLIT_TT_HOR" of FIG. 4 (e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

FIG. 6 is a flow diagram of an inter-prediction method according to the embodiment of the present disclosure.

In reference to FIG. 6, an inter-prediction method includes determining an inter-prediction mode for a current block S601, obtaining motion information of the current block according to the determined inter-prediction mode S602, and performing motion compensation prediction for a current block on the basis of the obtained motion information S603.

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 7 is a flow diagram of a process deriving the motion information of a current block under a merge mode.

The merge candidate of a current block may be derived S701. The merge candidate of a current block may be derived from a block encoded/decoded by inter-prediction prior to a current block.

FIG. 8 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (−1, −1) may be used as a candidate block. In reference to a diagram, the neighboring blocks of index 0 to 4 may be used as candidate blocks.

A non-neighboring base sample represents a sample that at least one of a x-axis distance or a y-axis distance with a base sample adjacent to a current block has a predefined value. In an example, at least one of a block including a base sample that a x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

Alternatively, a candidate block not belonging to the same coding tree unit as a current block may be set to be unavailable as a merge candidate. In an example, when a base sample is out of an upper boundary of a coding tree unit to which a current block belongs, a candidate block including the base sample may be set to be unavailable as a merge candidate.

A merge candidate may be derived from a temporal neighboring block included in a picture different from a current block. In an example, a merge candidate may be derived from a collocated block included in a collocated picture. Any one of reference pictures included in a reference picture list may be set as a collocated picture. Index information identifying a collocated picture among reference pictures may be signaled in a bitstream. Alternatively, a reference picture with a predefined index among reference pictures may be determined as a collocated picture.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S702.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S703. Concretely, information for specifying any one of a plurality of merge candidates may be signaled in a bitstream. In an example, information, merge_idx, representing an index of any one of merge candidates included in a merge candidate list may be signaled in a bitstream.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 9 is a diagram to explain the update aspect of a motion information table.

For a current block, when inter-prediction is performed S901, a motion information candidate may be derived based on a current block S902. The motion information of a motion information candidate may be set the same as that of a current block.

When a motion information table is empty S903, a motion information candidate derived based on a current block may be added to a motion information table S904.

When a motion information table already includes a motion information candidate S903, a redundancy check for the motion information of a current block (or, a motion information candidate derived based on it) may be performed S905. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S908. Whether motion information candidates are identical may be determined based on whether the motion information (e.g. a motion vector/a reference picture index, etc.) of motion information candidates is identical.

In this connection, when the maximum number of motion information candidates are already stored in a motion information table S906, the oldest motion information candidate may be deleted S907 and a motion information candidate derived based on a current block may be added to a motion information table S908. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, when the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 10 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 10, n).

When a motion information candidate identical to a motion information candidate derived based on a current block is prestored S905, a motion information candidate derived based on a current block may not be added to a motion information table S909.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 11 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 11 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

When motion compensation prediction is performed per sub-block basis, a motion information candidate may be derived based on the motion information of a representative sub-block among a plurality of sub-blocks included in a current block. In an example, when a sub-block merge candidate is used for a current block, a motion information candidate may be derived based on the motion information of a representative sub-block among sub-blocks.

The motion vector of sub-blocks may be derived in the following order. First, any one of merge candidates included in the mere candidate list of a current block may be selected and an initial shift vector (shVector) may be derived based on the motion vector of a selected merge candidate. And, a shift sub-block that a base sample is at a position of (xColSb, yColSb) may be derived by adding an initial shift vector to the position (xSb, ySb) of the base sample of each sub-block in a coding block (e.g. a left-top sample or a center sample). The below Equation 1 shows a formula for deriving a shift sub-block.

$$(x\text{ColSb}, y\text{ColSb}) = (x\text{Sb} + \text{shVector}[0] >> 4, y\text{Sb} + \text{shVector}[1] >> 4)$$ [Equation 1]

Then, the motion vector of a collocated block corresponding to the center position of a sub-block including (xColSb, yColSb) may be set as the motion vector of a sub-block including (xSb, ySb).

A representative sub-block may mean a sub-block including the left-top sample or center sample of a current block.

FIG. 12 is a diagram showing the position of a representative sub-block.

FIG. 12 (a) shows an example in which a sub-block positioned at the left-top of a current block is set as a representative sub-block and FIG. 12 (b) shows an example in which a sub-block positioned at the center of a current block is set as a representative sub-block. When motion compensation prediction is performed in a basis of a sub-block, the motion information candidate of a current block may be derived based on the motion vector of a sub-block including the left-top sample of a current block or including the central sample of a current block.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

Alternatively, a motion information candidate may be derived based on at least one sub-block vector of a sub-block included in a block encoded/decoded based on an affine motion model. In an example, a motion information candidate may be derived by using a sub-block positioned at the left-top, the center or the right-top of a current block. Alternatively, the average value of the sub-block vectors of a plurality of sub-blocks may be set as the motion vector of a motion information candidate.

Alternatively, a motion information candidate may be derived based on the average value of the affine seed vectors of a block encoded/decoded based on an affine motion model. In an example, at least one average of the first affine seed vector, the second affine seed vector or the third affine seed vector of a current block may be set as the motion vector of a motion information candidate.

Alternatively, a motion information table may be configured per inter-prediction mode. In an example, at least one of a motion information table for a block encoded/decoded by an intra block copy, a motion information table for a block encoded/decoded based on a translation motion model or a motion information table for a block encoded/decoded based on an affine motion model may be defined. According to the inter-prediction mode of a current block, any one of a plurality of motion information tables may be selected.

FIG. 13 shows an example in which a motion information table is generated per inter-prediction mode.

When a block is encoded/decoded based on a non-affine motion model, a motion information candidate mvCand derived based on the block may be added to a non-affine motion information table HmvpCandList. On the other hand, when a block is encoded/decoded based on an affine motion model, a motion information candidate mvAfCand derived based on the above model may be added to an affine motion information table HmvpCandList.

The affine seed vectors of the above block may be stored in a motion information candidate derived from a block encoded/decoded based on an affine motion model. Accordingly, the motion information candidate may be used as a merge candidate for deriving the affine seed vectors of a current block.

An additional motion information table may be defined in addition to the described motion information table. A long-term motion information table (hereinafter, referred to as the second motion information table) may be defined in addition to the above-described motion information table (hereinafter, referred to as the first motion information table). In this connection, a long-term motion information table includes long-term motion information candidates.

When both the first motion information table and the second motion information table are empty, first, a motion information candidate may be added to the second motion information table. After the number of motion information candidates available for the second motion information table reaches the maximum number, a motion information candidate may be added to the first motion information table.

Alternatively, one motion information candidate may be added to both the second motion information table and the first motion information table.

In this connection, a second motion information table which is fully filled may not perform an update any more. Alternatively, when a decoded region in a slice is over a predetermined ratio, the second motion information table may be updated. Alternatively, the second motion information table may be updated per N coding tree unit line.

On the other hand, the first motion information table may be updated whenever an encoded/decoded block is generated by inter-prediction. But, a motion information candidate added to the second motion information table may be set not to be used to update the first motion information table.

Information for selecting any one of the first motion information table or the second motion information table may be signaled in a bitstream. When the number of a merge candidate included in a merge candidate list is less than the threshold, motion information candidates included in a motion information table indicated by the information may be added to a merge candidate list as a merge candidate.

Alternatively, a motion information table may be selected based on a size of a current block, a shape of the current block, an inter-prediction mode of the current block, whether bidirectional prediction is applied to the current block, whether a motion vector is refined or whether a triangular partitioning is applied to the current block.

Alternatively, when the number of merge candidates included in a merge candidate list is less than the maximum number even though a motion information candidate included in the first motion information table is added, a motion information candidate included in the second motion information table may be added to a merge candidate list.

FIG. 14 is a diagram showing an example in which a motion information candidate included in a long-term motion information table is added to a merge candidate list.

In case that the number of a merge candidate included in a merge candidate list is less than the maximum number, a motion information candidate included in the first motion information table HmvpCandList may be added to a merge candidate list. In When the number of a merge candidate included in the merge candidate list is less than the maximum number even though motion information candidates included in the first motion information table is added to a merge candidate list, a motion information candidate included in a long-term motion information table HmvpLT-CandList may be added to the merge candidate list.

Table 1 shows a process in which motion information candidates included in a long-term information table are added to a merge candidate list.

TABLE 1

For each candidate in HMVPCandList with index HMVPLTIdx = 1..numHMVPLTCand, the following ordered steps are repeated until combStop is equal to true
   sameMotion is set to FALSE
   If hmvpStop is equal to FALSE and numCurrMergecand is less than (MaxNumMergeCand-1), hmvpLT is set to TRUE
   If HMVPLTCandList[NumLTHmvp-HMVPLTIdx] have the same motion vectors and the same reference indices with any mergeCandList[i] with I being 0..numOrigMergeCand-1 and HasBeenPruned[i] equal to false, sameMotion is set to true
   If sameMotion is equal to false, mergeCandList [numCurrMergeCand++] is set to HMVPLTCandList [NumLTHmvp-HMVPLTIdx]
   If numCurrMergeCand is equal to (MaxNumMergeCand-1), hmvpLTStop is set to TRUE A motion information candidate may be set to include additional information except for motion information. In an example, at least one of a size, shape or partition information of a block may be additionally stored in a motion information candidate. When the merge candidate list of a current block is configured, only motion information candidate whose a size, shape or partition information is identical or similar to a current block among motion information candidates may be used or a motion information candidate whose a size, shape or partition information is identical or similar to a current block may be added to a merge candidate list in advance.

Alternatively, a motion information table may be generated per block size, shape or partition information. The merge candidate list of a current block may be configured by using a motion information table matching the shape, size or partition information of a current block among a plurality of motion information tables.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

In an example, Table 2 shows a process in which a motion information candidate is added to a merge candidate list.

TABLE 2

For each candidate in HMVPCandList with index HMVPIdx = 1..numCheckedHMVPCand, the following ordered steps are repeated until combStop is equal to true
  sameMotion is set to false
  If HMVPCandList[NumHmvp-HMVPIdx] have the same motion vectors and the same reference indices with any mergeCandList[i] with I being 0..numOrigMergeCand-1 and HasBeenPruned[i] equal to false, sameMotion is set to true
  If sameMotion is equal to false, mergeCandList [numCurrMergeCand++] is set to HMVPCandList [NumHmvp-HMVPIdx]
  If numCurrMergeCand is equal to (MaxNumMergeCand-1), hmvpStop is set to TRUE A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index.

Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 15 is a diagram showing an example in which a redundancy check is performed only for a part of merge candidates.

When a motion information candidate HmvpCand[j] is added to a merge candidate list, a redundancy check with 2 merge candidates with the largest index, mergeCandList [NumMerge-2] and mergeCandList[NumMerge-1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether mergeCandList[0] and mergeCandList[1] are identical to HmvpCand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList [NumMerge-2] and mergeCandList[NumMerge-1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 16 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i-1] whose index is i-1 and merge candidates may be performed without adding the motion information candidate HmvpCand[i] to a merge candidate list. In this connection, a redundancy check between the motion information candidate HmvpCand[i−1] and the merge candidate mergeCandList[j] may be omitted.

In an example, in an example shown in FIG. 16, it was determined that HmvpCand[i] and mergeCandList[2] are identical. Accordingly, a redundancy check for HmvpCand [i−1] may be performed without adding HmvpCand[i] to a merge candidate list. In this connection, a redundancy check between HmvpCand[i−1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate—Temporal merge candidate—Motion information candidate—(Affine motion information candidate)—Pairwise merge candidate—Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

A motion information table may be used in a motion vector prediction mode. In an example, when the number of a motion vector prediction candidate included in the motion vector prediction candidate list of a current block is less than the threshold, a motion information candidate included in a motion information table may be set as a motion vector prediction candidate for a current block. Concretely, the motion vector of a motion information candidate may be set as a motion vector prediction candidate.

If any one of motion vector prediction candidates included in the motion vector prediction candidate list of a current block is selected, a selected candidate may be set as a motion vector predictor of a current block. Then, after the motion vector residual value of a current block is decoded, the motion vector of a current block may be obtained by adding up the motion vector predictor and the motion vector residual value.

The motion vector prediction candidate list of a current block may be configured in the following order.

Spatial motion vector prediction candidate—Temporal motion vector prediction candidate—Motion information candidate—(Affine motion information candidate)—Zero motion vector prediction candidate A spatial motion vector prediction candidate means a motion vector prediction candidate derived from at least one of a neighboring block or a non-neighboring block and a temporal motion vector prediction candidate means a motion vector prediction candidate derived from a previous reference picture. An affine motion information candidate represents a motion information candidate derived from a block encoded/decoded by an affine motion model. A zero motion vector prediction candidate represents a candidate that the value of a motion vector is 0.

A merge processing region larger than a coding block may be defined. Coding blocks included in a merge processing region may be processed in parallel without being sequentially encoded/decoded. In this connection, not being sequentially encoded/decoded means the order of encoding/decoding is not defined. Accordingly, the encoding/decoding process of blocks included in a merge processing region may be independently processed. Alternatively, blocks included in a merge processing region may share merge candidates. In this connection, the merge candidates may be derived based on a merge processing region.

According to the above-mentioned feature, a merge processing region may be referred to as a parallel processing region, a shared merge region (SMR) or a merge estimation region (MER).

A merge candidate of a current block may be derived based on a coding block. However, when a current block is included in a merge processing region larger than the current block, a candidate block included in the same merge processing region as the current block may be set to be unavailable as a merge candidate.

FIG. 17 is a diagram showing an example in which a candidate block included in the same merge processing region as a current block is set to be unavailable as a merge candidate.

In an example shown in FIG. 17 (a), in the decoding/decoding of CU5, blocks including base samples adjacent to CU5 may be set as candidate blocks. In this connection, candidate blocks X3 and X4 included in the same merge processing region as CU5 may be set to be unavailable as a merge candidate of CU5. But, candidate blocks X0, X1 and X2 not included in the same merge processing region as CU5 may be set to be available as a merge candidate.

In an example shown in FIG. 17 (b), in the decoding/decoding of CU8, blocks including base samples adjacent to CU8 may be set as candidate blocks. In this connection, candidate blocks X6, X7 and X8 included in the same merge processing region as CU8 may be set to be unavailable as a merge candidate. However, candidate blocks X5 and X9 not included in the same merge processing region as CU8 may be set to be available as a merge candidate.

Alternatively, when a current block is included in a merge processing region, a neighboring block adjacent to a current block and to a merge processing region may be set as a candidate block.

FIG. 18 is a diagram showing an example which derives a merge candidate for a current block when a current block is included in a merge processing region.

As in an example shown in FIG. 18 (a), neighboring blocks adjacent to a current block may be set as candidate blocks for deriving the merge candidate of the current block. In this connection, a candidate block included in the same merge processing region as the current block may be set to be unavailable as a merge candidate. In an example, in deriving a merge candidate for a coding block CU3, a top neighboring block y3 and a right-top neighboring block y4 included in the same merge processing region as the coding block CU3 may be set to be unavailable as a merge candidate of the coding block CU3.

By scanning neighboring blocks adjacent to a current block in the predefined order, a merge candidate may be derived. In an example, the predefined order may be the order of y1, y3, y4, y0 and y2.

When the number of merge candidates which may be derived from neighboring blocks adjacent to a current block is less than a value that an offset is subtracted from the maximum number of merge candidates or the maximum number, a merge candidate for the current block may be derived by using neighboring blocks adjacent to a merge processing region like an example shown in FIG. 18 (b). In an example, neighboring blocks adjacent to a merge processing region including a coding block CU3 may be set as candidate blocks for the coding block CU3. In this connection, neighboring blocks adjacent to a merge processing region may include at least one of a left neighboring block x1, a top neighboring block x3, a left-bottom neighboring block x0, a right-top neighboring block x4 or a left-top neighboring block x2.

By scanning neighboring blocks adjacent to a merge processing region in the predefined order, a merge candidate may be derived. In an example, the predefined order may be the order of x1, x3, x4, x0 and x2.

In summary, a merge candidate on the coding block CU3 including in a merge processing region may be derived by scanning candidate blocks in the following scanning order.

(y1, y3, y4, y0, y2, x1, x3, x4, x0, x2)

But, the scanning order of the above-illustrated candidate blocks only shows the example of the present disclosure and candidate blocks may be scanned in the order different from the above example. Alternatively, the scanning order may be adaptively determined based on at least one of a size or a shape of a current block or a merge processing region.

A merge processing region may be square or non-square. Information for determining a merge processing region may be signaled in a bitstream. The information may include at least one of information representing the shape of a merge processing region or information representing the size of a merge processing region. When a merge processing region is non-square, at least one of information representing the size of a merge processing region, information representing the width or height of a merge processing region or information representing a ratio between the width and height of a merge processing region may be signaled in a bitstream.

The size of a merge processing region may be determined based on at least one of information signaled in a bitstream, picture resolution, the size of a slice or the size of a tile.

If motion compensation prediction is performed for a block included in a merge processing region, a motion information candidate derived based on the motion information of a block in which motion compensation prediction is performed may be added to a motion information table.

But, if a motion information candidate derived from a block included in a merge processing region is added to a motion information table, a case may occur where a motion information candidate derived from the block is used in the encoding/decoding of other block in the merge processing region whose encoding/decoding is actually slower than the block. In other words, although dependence between blocks should be excluded in the encoding/decoding of blocks included in a merge processing region, a case may occur where motion prediction compensation is performed by using the motion information of other block included in the merge processing region. To solve such a problem, although the encoding/decoding of a block included in a merge processing region is completed, the motion information of the block whose encoding/decoding is completed may not be added to a motion information table.

Alternatively, if motion compensation prediction is performed for blocks included in a merge processing region, a motion information candidate derived from the blocks may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on each block's motion information or the number of blocks with the same motion information.

Alternatively, a motion information candidate including a unidirectional motion information may be added to motion information table before a motion information candidate including bidirectional motion information. On the contrary, motion information candidate including bidirectional motion information may be added to a motion information table before a motion information candidate including unidirectional motion information.

Alternatively, a motion information candidate may be added to a motion information table in the order of high frequency of use or low frequency of use in a merge processing region or a coding tree unit.

When a current block is included in a merge processing region and the number of merge candidates included in a merge candidate list of the current block is less than the maximum number, a motion information candidate included in a motion information table may be added to the merge candidate list. In this connection, a motion information candidate derived from a block included in the same merge processing region as a current block may be set not to be added to the merge candidate list of the current block.

Alternatively, when a current block is included in a merge processing region, it may be set not to use a motion information candidate included in a motion information table. In other words, although the number of merge candidates included in a merge candidate list of the current block is less than the maximum number, a motion information candidate included in a motion information table may not be added to the merge candidate list.

In another example, a motion information table on a merge processing region or a coding tree unit may be configured. This motion information table plays a role of temporarily storing the motion information of blocks included in a merge processing region. To distinguish between a general motion information table and a motion information table for a merge processing region or a coding tree unit, the motion information table for the merge processing region or the coding tree unit is referred to as a temporary motion information table. And, a motion information candidate stored in the temporary motion information table is referred to as a temporary motion information candidate.

FIG. 19 is a diagram showing a temporary motion information table.

A temporary motion information table for a coding tree unit or a merge processing region may be configured. When motion compensation prediction is performed for a current block included in a coding tree unit or a merge processing region, the motion information of the block may not be added to a motion information table HmvpCandList. Instead, a temporary motion information candidate derived from the block may be added to a temporary motion information table HmvpMERCandList. In other words, a temporary motion information candidate added to a temporary motion information table may not be added to a motion information table. Accordingly, a motion information table may not include a motion information candidate derived based on motion information of blocks included in a coding tree unit or a merge processing region including a current block.

The maximum number of temporary motion information candidates which may be included by a temporary motion information table may be set the same as the maximum number of motion information candidates. Alternatively, the maximum number of temporary motion information candidates which may be included by a temporary motion information table may be determined according to a size of a coding tree unit or a merge processing region.

A current block included in a coding tree unit or a merge processing region may be set not to use a temporary motion information table on the corresponding coding tree unit or merge processing region. In other words, when the number of merge candidates included in the merge candidate list of the current block is less than the threshold, a motion information candidate included in a motion information table may be added to the merge candidate list and a temporary motion information candidate included in a temporary motion information table may not be added to the merge candidate list. Accordingly, the motion information of other block including in the same coding tree unit or the same merge processing region as the current block may not be used for the motion compensation prediction of the current block.

If the encoding/decoding of all blocks included in a coding tree unit or a merge processing region is completed, a motion information table and a temporary motion information table may be unified.

FIG. 20 is a diagram showing an example in which a motion information table and a temporary motion information table are unified.

If the encoding/decoding of all blocks included in a coding tree unit or a merge processing region is completed, a temporary motion information candidate included in a temporary motion information table may be updated in a motion information table as in an example shown in FIG. 20.

In this connection, temporary motion information candidates included in a temporary motion information table may be added to a motion information table in the order inserted in the temporary motion information table. (In other words, in the ascending order or the descending order of the index value)

In another example, temporary motion information candidates included in a temporary motion information table may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a temporary motion information candidate including a unidirectional motion information may be added to a motion information table before a temporary motion information candidate including a bidirectional motion information. On the contrary, a temporary motion information candidate including a bidirectional motion information may be added to a motion information table before a temporary motion information candidate including a unidirectional motion information.

Alternatively, a temporary motion information candidate may be added to a motion information table in the order of high frequency of use or low frequency of use in a merge processing region or a coding tree unit.

In case that a temporary motion information candidate included in a temporary motion information table is added to a motion information table, a redundancy check for a temporary motion information candidate may be performed. In an example, when the same motion information candidate as a temporary motion information candidate included in a temporary motion information table is prestored in a motion information table, the temporary motion information candidate may not be added to the motion information table. In this connection, a redundancy check may be performed for a part of motion information candidates included in a motion information table. In an example, a redundancy check may be performed for motion information candidates with an index over or below the threshold. In an example, when a temporary motion information candidate is equal to a motion information candidate with an index over the predefined value, the temporary motion information candidate may not be added to a motion information table.

It may limit the use of a motion information candidate derived from a block included in the same coding tree unit or the same merge processing region as a current block as the merge candidate of the current block. For it, the address information of a block may be additionally stored for a motion information candidate. The address information of a block may include at least one of the position of the block, the address of the block, the index of the block, the position of a merge processing region in which the block is included, the address of a merge processing region in which the block is included, the index of a merge processing region in which the block is included, the position of a coding tree region in which the block is included, the address of a coding tree region in which the block is included or the index of a coding tree region in which the block is included.

Intra-prediction is a method for performing prediction on a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra-prediction is a method of obtaining a prediction block of a current block on the basis of a non-directional intra-prediction mode or directional intra-prediction mode. Hereinafter, with reference to the figure, a process of intra-prediction based on general intra-prediction will be described.

FIG. 21 is a view of a flowchart showing an intra-prediction method according to an embodiment of the present disclosure.

A reference sample line of a current block may be determined S2101. The reference sample line means a group of reference samples included in a k-th spaced apart line from the top and/or the left of the current block. The reference sample may be derived from a reconstructed sample around the current block which has been already encoded/decoded.

Index information identifying a reference sample line for the current block among the plurality of reference sample lines may be signaled in a bitstream. In an example, index information, intra_luma_ref_idx, for specifying the reference sample line for the current block may be signaled in a bitstream. The index information may be signaled on a coding block basis.

A plurality of reference sample lines may include at least one of a first line, a second line, a third line, or a fourth line from a top and/or a left of the current block. A reference sample line consisted of a row adjacent to a top of the current block and a column adjacent to a left of the current block among the plurality of reference sample lines may be referred to as an adjacent reference sample line, and remaining reference sample lines may be referred to as non-adjacent reference sample lines.

Only some of the plurality of reference sample lines may be selected as a reference sample line for the current block. In one example, remaining reference sample lines other than a third non-adjacent reference sample line among the plurality of reference sample lines may be set as the candidate reference sample lines. Table 1 shows an index assigned to each of the candidate reference sample lines.

TABLE 3

| Index (intra_luma_ref_idx) | Reference sample line |
|---|---|
| 0 | Adjacent reference sample line |
| 1 | First non-adjacent reference sample line |
| 2 | Second non-adjacent reference sample line |

A larger or smaller number of the candidate reference sample lines than the number of the candidate reference sample lines as described above may be set. Further, the number or position of the non-adjacent reference sample lines set as the candidate reference sample lines may not be limited to the above described examples. In one example, a first non-adjacent reference sample line and a third non-adjacent reference sample line may be set as the candidate reference sample lines, or a second non-adjacent reference sample line and the third non-adjacent reference sample line may be set as the candidate reference sample lines. Alternatively, all of the first non-adjacent reference sample line, the second non-adjacent reference sample line and the third non-adjacent reference sample line may be set as the candidate reference sample lines.

The number or a type of the candidate reference sample lines may be determined based on at least one of a size, a shape, and a position of the current block, whether the current block is divided into sub-blocks, or an intra prediction mode for the current block.

Based on at least one of the position, the size, the shape of a current block or the prediction encoding mode of a neighboring block thereto, the reference sample line for the current block may be determined. In one example, when the current block adjoins a boundary of a picture, a tile, a slice or a coding tree unit, the adjacent reference sample line may be determined as the reference sample line for the current block.

Alternatively, when the current block has a non-square shape, the adjacent reference sample line may be determined as the reference sample line for the current block. Alternatively, when a ratio between a width and a height of the current block is above or below the threshold, the adjacent reference sample line may be determined as the reference sample line for the current block.

The reference sample line may include top reference samples located at the top of the current block and left reference samples located at the left of the current block. Top reference samples and left reference samples may be derived from reconstructed samples around the current block. The reconstructed samples may be in a state before the in-loop filter is applied.

Next, the intra prediction mode for the current block may be determined S2102. In this connection, at least one of a non-directional intra prediction mode or a directional intra prediction mode may be determined as the intra prediction mode for the current block. The non-directional intra prediction mode includes a planar mode and a DC mode. The directional intra prediction mode includes 33 or 65 modes from a left-bottom diagonal direction to a right-top diagonal direction.

FIG. 22 is a diagram showing intra prediction modes.

FIG. 22 (*a*) shows 35 intra prediction modes. FIG. 22 (*b*) shows 67 intra prediction modes.

The larger or smaller number of intra prediction modes than the number of those shown in FIG. 22 may be defined.

Based on an intra-prediction mode of a neighboring block adjacent to a current block, an MPM (Most Probable Mode) may be set. In this connection, a neighboring block may include a left neighboring block adjacent to the left of the current block and a top neighboring block adjacent to the top of the current block.

When an intra-prediction mode for the current block is determined, prediction samples for the current block may be obtained based on the determined intra-prediction mode S2103.

In case that the DC mode is selected, prediction samples for a current block are generated based on the average value of the reference samples. In detail, values of all of samples within the prediction block may be generated based on an average value of the reference samples. An average value may be derived using at least one of top reference samples adjacent to the top of the current block, and left reference samples adjacent to the left of the current block.

The number or a range of the reference samples used when deriving an average value may vary based on the shape of the current block. In an example, when a current block is a non-square block where a width is greater than a height, an average value may be calculated by using top reference samples. To the contrary, when a current block is a non-square block where a width is smaller than a height, an average value may be calculated by using left reference samples. In other words, when a width and a height of the current block are different, reference samples adjacent to the greater length may be used so as to calculate an average value. Alternatively, whether to calculate an average value by using top reference samples or by using left reference samples may be determined on the basis of a ratio between a width and a height of the current block.

When a planar mode is selected, a prediction sample may be obtained by using a horizontal directional prediction sample and a vertical directional prediction sample. In this connection, the horizontal directional prediction sample may be obtained on the basis of a left reference sample and a right reference sample which are positioned at the same horizontal line with the prediction sample, and the vertical directional prediction sample may be obtained on the basis of an top reference sample and a bottom reference sample which are positioned at the same vertical line with the prediction sample. In this connection, the right reference sample may be generated by copying a reference sample adjacent to the top-right corner of the current block, and the bottom reference sample may be generated by copying a reference sample adjacent to the lower-left corner of the current block. The horizontal directional prediction sample may be obtained on the basis of a weighted sum of the left reference sample and the right reference sample, and the vertical directional prediction sample may be obtained on the basis of a weighted sum of the top reference sample and the bottom reference sample. In this connection, a weighting factor assigned to each reference sample may be determined according to a position of the prediction sample. The prediction sample may be obtained on the basis of an average or a weighted sum of the horizontal directional prediction sample and the vertical directional prediction sample. When a weighted sum is used, a weighting factor assigned to the horizontal directional prediction sample and the vertical directional prediction sample may be determined on the basis of a position of the prediction sample.

When a directional prediction mode is selected, a parameter representing a prediction direction (or prediction angle) of the selected directional prediction mode may be determined. Table 4 below represents an intra directional parameter of intraPredAng for each intra-prediction mode.

TABLE 4

| PredModeIntra | 1 | 2 | 3 | 4 | 5 | 6 | 7 |
|---|---|---|---|---|---|---|---|
| IntraPredAng | — | 32 | 26 | 21 | 17 | 13 | 9 |
| PredModeIntra | 8 | 9 | 10 | 11 | 12 | 13 | 14 |
| IntraPredAng | 5 | 2 | 0 | −2 | −5 | −9 | −13 |
| PredModeIntra | 15 | 16 | 17 | 18 | 19 | 20 | 21 |
| IntraPredAng | −17 | −21 | −26 | −32 | −26 | −21 | −17 |
| PredModeIntra | 22 | 23 | 24 | 25 | 26 | 27 | 28 |
| IntraPredAng | −13 | −9 | −5 | −2 | 0 | 2 | 5 |
| PredModeIntra | 29 | 30 | 31 | 32 | 33 | 34 | |
| IntraPredAng | 9 | 13 | 17 | 21 | 26 | 32 | |

Table 4 represents an intra directional parameter of each intra-prediction mode where an index thereof is one of 2 to 34 when 35 intra-prediction modes are defined. When directional intra-prediction modes are defined more than 33, an intra directional parameter of each intra-prediction mode may be set by subdividing Table 4.

Top reference samples and left reference samples for the current block are arranged in a line, and then a prediction sample may be obtained on the basis of a value of an intra directional parameter. In this connection, when a value of the intra directional parameter is a negative value, left reference samples and top reference samples may be arranged in a line.

A reference sample index, iIdx, and a weighting factor parameter, ifact, may be respectively obtained through Equations 2 and 3 below.

$$iIdx=(y+1)*P_{ang}/32 \quad \text{[Equation 2]}$$

$$i_{fact}=[(y+1)*P_{ang}]\&31 \quad \text{[Equation 3]}$$

In Equations 2 and 3, Pang represents an intra directional parameter. A reference sample specified by a reference sample index of iIdx corresponds to an integer pel.

In order to derive a prediction sample, at least one reference sample may be specified. In detail, according to a slope of a prediction mode, a position of a reference sample used for deriving a prediction sample may be specified. In an example, a reference sample used for deriving a prediction sample may be specified by using a reference sample index of iIdx.

In this connection, when a slope of an intra-prediction mode is not represented by one reference sample, a prediction sample may be generated by performing interpolation on a plurality of reference samples. In an example, when a slope of an intra-prediction mode is a value between a slope between a prediction sample and a first reference sample, and a slope between the prediction sample and a second reference sample, the prediction sample may be obtained by performing interpolation on the first reference sample and the second reference sample. In other words, when an angular line according to an intra-prediction angle does not pass a reference sample positioned at an integer pel, a prediction sample may be obtained by performing interpolation on reference samples positioned adjacent to the left and the right, or the top and the bottom of the position where the angular line passes.

Equation 4 below represents an example of obtaining a prediction sample on the basis of reference samples.

$$P(x,y)=((32-i_{fact})/32)*Ref\_1D(x+iIdx+1)+(i_{fact}/32)*Ref\_1D(x+iIdx+2) \quad \text{[Equation 4]}$$

In Equation 4, P represents a prediction sample, and Ref_1D represents any one of reference samples that are arranged in a line. In this connection, a position of the reference sample may be determined by a position (x, y) of the prediction sample and a reference sample index of iIdx.

When a slope of an intra-prediction mode is possibly represented by one reference sample, a weighting factor parameter of ifact is set to 0. Accordingly, Equation 4 may be simplified as Equation 5 below.

$$P(x,y)=Ref\_1D(x+iIdx+1) \quad \text{[Equation 5]}$$

When a current block is a non-square, a case may be present where a prediction sample is derived by using, among reference samples positioned at the angular line according to an intra-prediction angle, a reference sample that is positioned farther than a reference sample close to a prediction sample according to an intra-prediction mode for the current block.

To solve the above problem, when a current block is a non-square, an intra-prediction mode for the current block may be substituted with an intra-prediction mode in opposite direction. Accordingly, for a non-square block, directional prediction modes having angles greater or smaller than those of directional prediction modes shown in FIG. 22 may be used. The above directional intra-prediction mode may be defined as a wide angle intra-prediction mode. A wide angle intra-prediction mode represents a directional intra-prediction mode that does not belong to a range of 45 degrees to −135 degrees.

FIG. 23 is a view showing wide angle intra-prediction modes.

In an example show in FIG. 23, intra-prediction modes having indices from −1 to −14 and intra-prediction modes having indices from 67 to 80 represent wide angle intra-prediction modes.

In FIG. 23, 14 wide angle intra-prediction modes (from −1 to −14) which are greater in angle than 45 degrees and 4 wide angle intra-prediction modes (from 67 to 80) which are smaller in angle than −135 degrees are shown. However, more or fewer number of wide angle intra-prediction modes may be defined.

When a wide angle intra-prediction mode is used, a length of top reference samples may be set to 2W+1, and a length of left reference samples may be set to 2H+1.

When a prediction block is generated as a result of intra-prediction, prediction samples may be updated based on each position of prediction samples included in a prediction block. Such an update method may be referred to as a sample position-based intra weighting prediction method (or, Position Dependent Prediction Combination, PDPC).

Whether PDPC is used may be determined considering an intra-prediction mode of a current block, a reference sample line of a current block, a size of a current block or a color component. In an example, PDPC may be used when the intra-prediction mode of a current block is at least one of a planar, DC, a vertical direction, a horizontal direction, a mode with an index value smaller than a vertical direction or a mode with an index value larger than a horizontal direction. Alternatively, PDPC may be used only when at least one of a width or height of a current block is greater than 4. Alternatively, PDPC may be used only when the index of a reference picture line of a current block is 0. Alternatively, PDPC may be used only when the index of a reference picture line of a current block is over the predefined value. Alternatively, PDPC may be used only for a luminance component. Alternatively, Whether PDPC is used may be determined according to whether more than 2 of the above-enumerated conditions are satisfied.

In another example, information showing whether PDPC is applied may be signaled in a bitstream.

When a prediction sample is obtained through an intra-prediction sample, a reference sample used to correct the prediction sample may be determined based on the position of the obtained prediction sample. For the convenience of explanation, a reference sample used to correct a prediction sample is referred to as a PDPC reference sample in the embodiment described later. In addition, a prediction sample obtained by intra-prediction is referred to as a first prediction sample and a prediction sample obtained by correcting the first prediction sample is referred to as a second prediction sample.

FIG. 24 is a diagram showing the application aspect of PDPC.

With at least one PDPC reference sample, the first prediction sample may be corrected. A PDPC reference sample may include at least one of a reference sample adjacent to the left-top corner of a current block, a top reference sample positioned at the top of a current block or a left reference sample positioned at the left of a current block.

At least one of reference samples belonging to the reference sample line of a current block may be set as a PDPC reference sample. Alternatively, regardless of a reference sample line of a current block, at least one of reference samples belonging to a reference sample line that an index is 0 may be set as a PDPC reference sample. In an example, although the first prediction sample is obtained by using a reference sample included in a reference sample line that an index is 1 or 2, the second prediction sample may be obtained by using a reference sample included in a reference sample line that an index is 0.

The number or position of PDPC reference samples used to correct the first prediction sample may be determined considering at least one of an intra-prediction mode of a current block, a size of a current block, a shape of a current block or a position of the first prediction sample.

In an example, when the intra-prediction mode of a current block is a planar or a DC mode, the second prediction sample may be obtained by using a top reference sample and a left reference sample. In this connection, a top reference sample may be a reference sample vertical to the first prediction sample (e.g. a reference sample with the same x-coordinate) and a left reference sample may be a reference sample horizontal to the first prediction sample (e.g. a reference sample with the same y-coordinate).

When the intra-prediction mode of a current block is a horizontal directional intra-prediction mode, the second prediction sample may be obtained by using a top reference sample. In this connection, a top reference sample may be a reference sample vertical to the first prediction sample.

When the intra-prediction mode of a current block is a vertical directional intra-prediction mode, the second prediction sample may be obtained by using a left reference sample. In this connection, a left reference sample may be a reference sample horizontal to the first prediction sample.

When the intra-prediction mode of a current block is a left-bottom diagonal directional or a right-top diagonal directional intra-prediction mode, the second prediction sample may be obtained based on a left-top reference sample, a top reference sample and a left reference sample. A left-top reference sample may be a reference sample adjacent to the left-top corner of a current block (e.g. a reference sample positioned at (−1, −1)). A top reference sample may be a reference sample positioned at the right-top diagonal direction of the first prediction sample and a left reference sample may be a reference sample positioned at the left-bottom diagonal direction of the first prediction sample.

In summary, when the first prediction sample is positioned at (x, y), R(−1, −1) may be set as a left-top reference sample and R(x+y+1, −1) or R(x, −1) may be set as a top reference sample. In addition, R(−1, x+y+1) or R(−1, y) may be set as a left reference sample.

A single prediction mode may be applied to a current block multiple times or a plurality of prediction modes may be applied repeatedly. Likewise, a prediction method using prediction modes of the same kind or of a different kind may be referred to as a combined prediction mode (or, Multi-hypothesis Prediction Mode).

A combined prediction mode may include at least one of a mode that a merge mode and a merge mode are combined, a mode that inter-prediction and intra-prediction are combined, a mode that a merge mode and a motion vector prediction mode are combined, a mode that a motion vector prediction mode and a motion vector prediction mode are combined or a mode that a merge mode and intra-prediction are combined.

In a combined prediction mode, the first prediction block may be generated based on the first prediction mode and the second prediction block may be generated based on the second prediction mode. Then, the third prediction block may be generated based on a weighted sum operation of the first prediction block and the second prediction block. The third prediction block may be set as the final prediction block of a current block.

Based on a size or shape of a current block, whether a combined prediction mode is used may be determined. In an example, whether a combined prediction mode is used may be determined based on at least one of the size of a coding block, the number of samples included in a coding block, a width of a coding block or a height of a coding block. In an example, when at least one of the width or height of a coding block is over 128 or when the number of samples included in a coding block is below 64, a combined prediction mode may not be applied to the coding block.

Alternatively, information showing whether a combined prediction mode is applied to a current block may be signaled in a bitstream. In an example, the information may be a 1-bit flag. In an example, a flag, mh_intra_flag, indicating whether a combined prediction mode that a merge mode and intra-prediction are combined is used, may be signaled in a bitstream. When Mh_intra_flag is 1, it represents that a combined prediction mode in which a merge mode and intra-prediction are combined is used and when mh_intra_flag is 0, it represents that a combined prediction mode in which a merge mode and intra-prediction are combined is not used.

Only when the prediction encoding mode of a current block is an inter-prediction mode and when a merge mode is applied to the current block, a combined prediction mode in which the merge mode and intra-prediction are combined may be applied to the current block. In other words, mh_intra_flag may be signaled when the value of a flag, merge flag, indicating whether the merge mode is applied to the current block is 1.

In a prediction mode in which a merge mode and intra-prediction are combined, the intra-prediction mode of a current block may be set as a predefined intra-prediction mode. In an example, when a combined prediction mode is used, the intra-prediction mode of a current block may be set as a planar mode.

In another example, when a combined prediction mode in which a merge mode and intra-prediction are combined is used, the intra-prediction mode of a current block may be determined as one of candidate intra-prediction modes. In this connection, candidate intra-prediction modes may include at least one of a non-directional intra-prediction mode or a directional intra-prediction mode for a specific direction. In this connection, the non-directional intra-prediction mode may include at least one of DC or planar and the directional intra-prediction mode may include at least one of the intra-prediction mode of a horizontal direction, the intra-prediction mode of a vertical direction or the intra-prediction mode of a diagonal direction. In an example, when a combined prediction mode is used, only the intra-prediction mode of a DC, planar or horizontal direction or a vertical direction can be set as the intra-prediction mode of a current block. Alternatively, when a combined prediction mode is used, only the intra-prediction mode of a planar, horizontal direction, or vertical direction can be set as the current block's intra-prediction mode. Alternatively, when a combined prediction mode is used, only the intra-prediction mode of a DC, planar, or vertical direction can be set as the current block's intra-prediction mode. Alternatively, when a combined prediction mode is used, only the intra-prediction mode of a DC, planar, or horizontal direction can be set as the current block's intra-prediction mode.

Index information for specifying any one of candidate intra-prediction modes may be signaled in a bitstream. In an example, an index, mh_intra_idx, specifying any one of candidate intra-prediction modes, may be signaled in a bitstream. Table 5 and 6 show an intra-prediction mode according to the value of mh_intra_idx. The intra-prediction mode of a current block may be determined as an intra-prediction mode indicated by mh_intra_idx.

TABLE 5

| mh_intra_idx | 0 | 1 | 2 | 3 |
|---|---|---|---|---|
| intra mode | PLANAR | DC | VERTICAL | HORIZONTAL |

TABLE 6

| mh_intra_idx | 0 | 1 | 2 |
|---|---|---|---|
| intra mode | PLANAR | VERTICAL | HORIZONTAL |

The number of candidate intra-prediction modes may have a fixed value in an encoder and a decoder. Alternatively, according to at least one of a size or shape of a current block or whether a neighboring block is encoded by intra-prediction, the number or type of candidate intra-prediction modes may vary.

In another example, when a combined prediction mode in which a merge mode and intra-prediction are combined is applied, based on MPMs, the intra-prediction mode of a current block may be determined. In this connection, the number of MPMs included in an MPM list when general intra-prediction is applied may be different from that of MPMs included in an MPM list when a combined prediction mode is applied. In an example, while an MPM list includes 6 or 5 MPMs when a combined prediction mode is not applied, an MPM list may include 4 or 3 MPMs when a combined prediction mode is applied. In other words, while N MPMs are used when general intra-prediction is performed, MPMs less than N may be used when a combined prediction mode is applied.

In an example, when general intra-prediction mode is applied, it is assumed that MPMs derived based on the intra-prediction mode of a neighboring block adjacent to a current block are planar, DC, INTRA_MODE32, INTRA_MODE31, INTRA_MODE33 and INTRA_MODE30. when a combined prediction mode is applied to a current block, the intra-prediction mode of a current block may be determined by using only a part of the above 6 MPMs. In an example, the intra-prediction mode of a current block may be determined by using an MPM list including 3 MPMs, planar, DC and INTRA_MODE32, having the smallest index among the MPMs. Alternatively, one having a predefined index value among the MPMs may be determined as the intra-prediction mode of a current block.

In another example, the number of MPMs used to determine the intra-prediction mode of a current block when general intra-prediction is applied may be set the same as the number of MPMs used to determine the intra-prediction mode of a current block when a combined prediction mode is applied.

When a combined prediction mode is applied, the encoding of an MPM flag may be omitted and the MPM flag may be inferred true. In other words, when a combined prediction mode is applied, any one of MPMs may be determined as the intra-prediction mode of a current block.

Alternatively, based on the intra-prediction modes of neighboring blocks adjacent to a current block, the intra-prediction mode of the current block may be derived. In this connection, a neighboring block may include at least one of a top neighboring block, a left neighboring block, a left-top neighboring block, a right-top neighboring block or a left-bottom neighboring block. The intra-prediction mode of a current block may be set as an intra-prediction mode with the highest frequency among the intra-prediction modes of neighboring blocks adjacent to the current block.

Alternatively, by comparing the intra-prediction modes of neighboring blocks at a predefined position, the intra-prediction mode of a current block may be determined. In an example, when the intra-prediction mode of a top neighboring block and a left neighboring block of a current block is identical, the intra-prediction mode of the current block may be set the same as the intra-prediction mode of the top neighboring block and the left neighboring block.

Alternatively, index information for specifying a neighboring block identical to the intra-prediction mode of a current block among a plurality of neighboring blocks may be signaled in a bitstream. In an example, information indicating any one of a top neighboring block or a left neighboring block may be signaled in a bitstream and the intra-prediction mode of a current block may be set the same as the intra-prediction mode of a block indicated by the information.

Alternatively, when a combined prediction mode is applied to a neighboring block, the intra-prediction mode of the neighboring block to which the combined prediction mode is applied may be set as the intra-prediction mode of a current block.

When a combined prediction mode in which a merge mode and intra-prediction are combined is applied to a current block, it may be set not to use a multi-line intra-prediction encoding method. If the multi-line intra-prediction encoding method is not used, an adjacent reference sample line may be used for the intra-prediction of the current block.

Alternatively, when a combined prediction mode in which a merge mode and intra-prediction are combined is applied to a current block, it may be set to use a multi-line intra-prediction encoding method. Information for determining the reference sample line of the current block among a plurality of reference sample lines may be signaled in a bitstream. Alternatively, considering at least one of the size of a current block, the shape of a current block, the intra-prediction mode of a current block or the reference sample line of a neighboring block, the reference sample line of the current block may be determined.

Alternatively, information indicating whether a multi-line intra method is applied in a combined prediction mode may be signaled in a bitstream. The information may be 1-bit flag. When the above indicates a multi-line intra method is applied, index information specifying any one of multi-lines may be signaled in a bitstream.

According to the reference sample line of a current block, the number of available candidate intra-prediction modes may be set differently. In an example, when an adjacent reference sample line is used, a candidate intra-prediction mode may include at least one of the intra-prediction mode of a planar, DC, horizontal directional intra-prediction mode, a vertical directional intra-prediction mode, a left-bottom diagonal directional intra-prediction mode or a right-top diagonal directional intra-prediction mode. On the other hand, when a non-adjacent reference sample line is used, a candidate intra-prediction mode may include at least one of a horizontal directional intra-prediction mode, a vertical directional intra-prediction mode, a left-bottom diagonal directional intra-prediction mode or a right-top diagonal directional intra-prediction mode.

The first prediction block may be generated by using a merge candidate selected in a merge mode and the second prediction block may be generated by using an intra-prediction mode. In this connection, when the first prediction block is generated, a triangular partitioning may be set not to be applied to a current block. In other words, a triangular partitioning may not be allowed in a combined prediction mode in which a merge mode and intra-prediction are combined. In addition, when the second prediction block is generated, PDPC may be set not to be applied to a current block. In other words, PDPC may not be allowed in a combined prediction mode in which a merge mode and intra-prediction are combined.

Based on the weighted sum operation of the first prediction block and the second prediction block, the third prediction block may be generated. In an example, Equation 6 is a diagram showing an example in which based on the weighted sum operation of the first prediction block and the second prediction block, the third prediction block is generated.

$$P_{comb}(w*P_{merge}+(N-w)*P_{intra}+4)>>\log_2 N \qquad \text{[Equation 6]}$$

In the Equation 6, $P_{merge}$ represents the first prediction block obtained based on a merge mode and $P_{intra}$ represents the second prediction block obtained based on intra-prediction. $P_{comb}$ represents the third prediction block obtained by combing the first prediction block and the second prediction block. w represents the first weight applied to the first prediction block. The second weight applied to the second prediction block may be derived by differentiating the first weight, w, from a constant N. In this connection, N may have a predefined value in an encoder and a decoder. In an example, N may by 4 or 8. Alternatively, a constant N may be derived based on at least one of a size, shape or intra-prediction mode of a current block.

Unlike an example shown in Equation 6, w may be set as the second weight and a value differentiating the second weight from a predetermined constant N may be set as the first weight.

Weights applied to the first prediction block and the second prediction block may be determined based on at least one of the intra-prediction mode of a current block or whether a merge mode has bidirectional motion information. In an example, the value of the first weight, w, when the intra-prediction mode of a current block is a directional prediction mode may have a value greater than the value of the first weight, w, when the intra-prediction mode of a current block is a non-directional prediction mode. Alternatively, the value of the first weight, w, when a bidirectional prediction is performed by a merge candidate may have a value greater than the value of the first weight, w, when a uni-directional prediction is performed by a merge candidate.

In another example, weights may be determined considering the prediction encoding mode of neighboring blocks adjacent to a current block. In this connection, a neighboring block may include at least one of a top neighboring block adjacent to the top of the current block, a left neighboring block adjacent to the left of the current block or a left-top neighboring block adjacent to the left-top corner of the current block. A weight may be determined based on the number of neighboring blocks encoded by intra-prediction among neighboring blocks adjacent to the current block. In an example, it may be set that as the number of neighboring blocks encoded by intra-prediction among neighboring blocks adjacent to the current block is on the increase, the first weight has a small value and the second weight has a large value. On the other hand, it may be set that as the number of neighboring blocks encoded by non-intra-prediction among neighboring blocks adjacent to the current block is on the decrease, the first weight has a large value and the second weight has a small value. In an example, when both a left neighboring block and a top neighboring block are encoded by intra-prediction, the second weight may be set as n. When only one of a left neighboring block and a top neighboring block is encoded by intra-prediction, the second weight may be set as n/2. When both a left neighboring block and a top neighboring block are not encoded by intra-prediction, the second weight may be set as n/4. In this connection, n represents an integer equal to or smaller than N.

A weight may be determined in a sample or a sub-block unit in a current block. In an example, a current block is partitioned into a plurality of sub-blocks and a weight applied to each sub-block may be set to respectively have a different value. In this connection, the number of sub-blocks may have a fixed value in an encoder and a decoder. Alternatively, based on at least one of the size or shape of a current block, an intra-prediction mode of a current block or the prediction encoding mode of a neighboring block, the number of sub-blocks may be adaptively determined.

FIG. 25 is a diagram showing the application aspect of a weight.

A current block is partitioned into a plurality of sub-blocks and a weight applied to each sub-block may be set as a value different from each other. In an example, as in an example shown in (a) and (b) of FIG. 25, while the second weight may be set to have a value larger than the first weight for a sub-block including a sample positioned at a left-top corner in a current block, the first weight may be set to have a value larger than the second weight for a sub-block including a sample positioned at a right-bottom corner in a current block.

The third prediction sub-block for a sub-block may be obtained by the weighted prediction of the first prediction sub-block and the second prediction sub-block corresponding to the sub-block. In this connection, as in an example shown in FIG. 25, a weight used for weighted prediction per sub-block may be differently set.

According to whether a merge candidate has bidirectional motion information, a weight assigned to a sub-block may be differently determined.

FIG. 26 shows an example in which according to whether a merge candidate has bidirectional motion information, a different weight is assigned to a sub-block.

When a merge candidate has bidirectional motion information, the first weight, w, assigned to at least one of sub-blocks may be set as a large value in comparison with a case in which a merge candidate has uni-directional motion information. In an example, (a) and (b) of FIG. 26 illustrated that regarding all sub-blocks, a weight, w, applied when a bidirectional prediction is applied has a value larger than a weight, w, applied when an uni-directional prediction is applied.

Alternatively, based on the intra-prediction mode of a current block, a weight applied to a sub-block may be determined.

FIG. 27 shows an example in which a different weight is assigned to a sub-block according to the intra-prediction mode of a current block.

When the intra-prediction mode of a current block has a vertical direction, the second weight of a sub-block positioned at the top of the current block may be set to have a value larger than the second weight of a sub-block positioned at the bottom of the current block.

In an example, while the second weight may be set to have a value larger than the first weight for a sub-block positioned at the top of the current block, the first weight may be set to have a value equal to or larger than the second weight for a sub-block positioned at the bottom of the current block.

When the intra-prediction mode of a current block has a horizontal direction, the second weight of a sub-block positioned at the left of the current block may be set to have a value larger than the second weight of a sub-block positioned at the right of the current block.

In an example, while the second weight may be set to have a value larger than the first weight for a sub-block positioned at the left of the current block, the first weight may be set to have a value equal to or larger than the second weight for a sub-block positioned at the right of the current block.

In another example, when the intra-prediction mode of a current block has a vertical direction, the first weight of a sub-block positioned at the top of the current block may be set to have a value larger than the first weight of a sub-block positioned at the bottom of the current block or when the intra-prediction mode of a current block has a horizontal direction, the first weight of a sub-block positioned at the left of the current block may be set to have a value larger than the first weight of a sub-block positioned at the right of the current block.

In another example, based on the prediction encoding mode of neighboring blocks adjacent to a current block, a weight assigned to each sub-block may be determined. In one example, when while the top neighboring block of the current block is encoded by intra-prediction, the left neighboring block of the current block is not encoded by intra-prediction, the second weight of a sub-block positioned at the top of the current block may be set to have a value larger than the second weight of a sub-block positioned at the bottom of the current block. On the other hand, when while the top neighboring block of the current block is not encoded by intra-prediction, the left neighboring block of the current block is encoded by intra-prediction, the second weight of a sub-block positioned at the left of the current block may be set to have a value larger than the second weight of a sub-block positioned at the right of the current block.

For at least one of a plurality of sub-blocks, the first or second weight may be set as 0. In other words, for at least one of a plurality of sub-blocks, the first or second prediction sub-block may be set as the third prediction sub-block. Accordingly, combined prediction may not be performed in at least one of a plurality of sub-blocks. In one example, for at least one of a plurality of sub-blocks, the first weight, w, may be set as 0 or a constant N.

A block to which a combined prediction mode that a merge mode and intra-prediction are combined is applied may be considered encoded by inter-prediction. Accordingly, the intra-prediction mode of a block encoded by a combined prediction mode may be set to be unavailable for deriving the intra-prediction mode of a block which will be encoded/decoded. In deriving an MPM, the intra-prediction mode of an unavailable block may be considered to be planar.

On the other hand, the motion information of a block encoded by a combined prediction mode may be set to be available for deriving the motion information of a block which will be encoded/decoded.

In a mode in which a merge mode and a merge mode are combined, motion compensation prediction may be performed by using a plurality of merge candidates. Concretely, the first prediction block may be generated by using the first merge candidate and the second prediction block may be generated by using the second merge candidate. Based on the weighted operation of the first prediction block and the second prediction block, the third prediction block may be generated.

Alternatively, after partitioning a current block into a plurality of sub-partitions (e.g., sub-blocks), a combined prediction mode may be applied.

FIG. 28 is a diagram showing an example in which a current block is partitioned into a plurality of sub-partitions.

As in an example shown in (a) to (d) of FIG. 28, a current block may be partitioned into 2 sub-partitions based on a horizontal line, a vertical line, the diagonal line of a left-top direction or the diagonal line of a right-top direction.

At least one of the information indicating whether a current block will be partitioned into a plurality of sub-partitions or information indicating the partition type of a current block may be signaled in a bitstream. Information indicating the partition type of a current block represents at least one of the type, direction or position of a partitioning line partitioning the current block. In one example, based on information indicating a partition type, at least one of whether a partitioning line partitioning the current block is a horizontal line, a vertical line or a diagonal line, or whether a partitioning line partitioning the current block connects the right-top and the left-bottom of the current block, or the left-top and the right-bottom of the current block may be determined.

A current block is partitioned into a plurality of sub-partitions and the motion information of each sub-partition may be set to be derived from different merge candidates. In one example, if the motion information of the first sub-partition is derived from the first merge candidate, the motion information of the second sub-partition may be derived from the second merge candidate different from the first merge candidate.

In a combined prediction mode in which a merge mode and a merge mode are combined, information for specifying the first merge candidate and the second merge candidate may be signaled in a bitstream, respectively. In one example, index information, merge_idx, for specifying the first merge candidate, and index information, merge_2nd_idx, for specifying the second merge candidate, may be signaled in a bitstream. The second merge candidate may be determined based on index information, merge_2nd_idx and index information, merge_idx.

Index information, merge_idx, specifies any one of merge candidates included in a merge candidate list.

Index information, merge_2nd_idx, may specify any one of residual merge candidates except for a merge candidate specified by merge_idx. Accordingly, when the value of merge_2nd_idx is smaller than that of merge_idx, a merge candidate that the value of merge_2nd_idx is an index may be set as the second merge candidate. When the value of merge_2nd_idx is equal to or larger than that of merge_idx, a merge candidate whose index value is obtained by adding 1 to the value of merge_2nd_idx may be set as the second merge candidate.

Alternatively, considering the search order of candidate blocks, the second merge candidate may be specified.

FIG. 29 shows an example in which the second merge candidate is specified considering the search order of candidate blocks.

In an example shown in FIG. 29, an index marked in neighboring and non-neighboring samples shows the search order of candidate blocks. In one example, candidate blocks may be sequentially searched from a position A0 to A14.

When an A4 block is selected as the first merge candidate, a merge candidate derived from a candidate block in the search order after A4 may be specified as the second merge candidate. In one example, a merge candidate derived from A5 may be selected as the second merge candidate. If a candidate block at a position of A5 is unavailable as a merge candidate, a merge candidate derived from a next-rank candidate block may be selected as the second merge candidate.

The first merge candidate and the second merge candidate may be selected among merge candidates derived from non-neighboring blocks.

FIG. 30 shows an example in which the first merge candidate and the second merge candidate are selected among merge candidates derived from non-neighboring blocks.

As in an example shown in FIG. 30, merge candidates derived from the first candidate block and the second candidate block non-adjacent to a current block may be selected as the first merge candidate and the second merge candidate, respectively. In this connection, a block line to which the first candidate block belongs may be different from a block line to which the second candidate block belongs. In one example, the first merge candidate may be derived from any candidate block of A5 to A10 and the second merge candidate may be derived from any candidate block of A11 to A15.

Alternatively, the first candidate block and the second candidate block may be set not to be included in the same line (e.g., a row, a column).

In another example, the second merge candidate may be specified based on the first merge candidate. In this connection, the first merge candidate may be specified by index information, merge_idx, signaled by a bitstream. In one example, a merge candidate neighboring the first merge candidate may be determined as the second merge candidate. In this connection, a merge candidate neighboring the first merge candidate may mean a merge candidate that a value of an index difference with the first merge candidate is 1. In one example, a merge candidate that an index value is merge_idx+1 may be set as the second merge candidate. In this connection, when the value of merge_idx+1 is greater than the maximum index value (or, when the index value of the first merge candidate is the maximum index), a merge candidate that an index value is merge_idx−1 or that an index value is a predefined value (e.g., 0) may be set as the second merge candidate.

Alternatively, a merge candidate neighboring the first merge candidate may mean a merge candidate derived from a candidate block spatially neighboring a candidate block used to derive the first merge candidate. In this connection, the neighboring candidate block of the candidate block may mean a block adjacent to the left, right, top, bottom or diagonal direction of the candidate block.

In another example, the second merge candidate may be specified based on the motion information of the first merge candidate. In one example, a merge candidate with the same reference picture as the first merge candidate may be selected as the second merge candidate. When there are multiple merge candidates with the same reference picture as the first merge candidate, a merge candidate with the smallest index, a merge candidate having the smallest difference of an index with the first merge candidate, or a merge candidate having the smallest difference of a motion vector with the first merge candidate among a plurality of merge candidates may be selected as the second merge candidate. Alternatively, the second merge candidate may be selected based on index information specifying any one of a plurality of merge candidates.

Alternatively, when the first merge candidate has unidirectional prediction information of the first direction, a merge candidate including motion information on the second direction may be set as the second merge candidate. In one example, when the first merge candidate has the motion information of L0 direction, a merge candidate having the motion information of L1 direction may be selected as the second merge candidate. When there are multiple merge candidates having the motion information of L1 direction, a merge candidate with the smallest index or a merge candidate having the smallest difference of an index with the first merge candidate among a plurality of merge candidates may be set as the second merge candidate. Alternatively, the second merge candidate may be selected based on index information specifying any one of multiple merge candidates.

When the first merge candidate is selected in a merge candidate list and the selected first merge candidate has the uni-directional motion information of the first direction, the merge candidate list may be rearranged, and based on the rearranged merge candidate list, the second merge candidate may be selected. Rearrangement may be performed in order that the index of a merge candidate having the motion information of the second direction has a value smaller than the index of a merge candidate having the motion information of the first direction.

FIG. 31 is a diagram showing an example in which a merge candidate is rearranged.

When the first merge candidate has the uni-directional motion information of L0 direction, rearrangement may be performed in order that a merge candidate having the motion information of L1 is placed in front of a merge candidate list.

In one example, as in an example shown in FIG. 31, rearrangement may be performed so that a merge candidate having the motion information of L1 direction has an index value smaller than a merge candidate having the uni-directional motion information of L0 direction.

Unlike an example shown in FIG. 31, the uni-directional merge candidate of L1 direction may be set to have a priority higher than a bidirectional merge candidate.

Alternatively, a first merge candidate list and a second merge candidate list may be generated. In this connection, respective the first merge candidate and the second merge candidate may be derived from a different merge candidate list. In one example, the first merge candidate may be derived from the first merge candidate list and the second merge candidate may be derived from the second merge candidate list. In this connection, the first merge candidate list may include merge candidates including the motion information of L0 direction and the second merge candidate list may include merge candidates including the motion information of L1 direction. Alternatively, when a merge candidate has bidirectional motion information, it may be set to use only one of L0 or L1 motion information. In this connection, whether which one of L0 or L1 motion information will be used may be determined based on the index of a merge candidate.

In one example, when the index of a merge candidate is an even number, only the L1 motion information of the merge candidate may be used. On the other hand, when the index of a merge candidate is an odd number, only the L0 motion information of the merge candidate may be used. Contrary to a described example, it may be set to use only L0 motion information when the index of the merge candidate is an even number and to use only L1 motion information when the index of the merge candidate is an odd number.

In another example, the first merge candidate may be set as one of merge candidates derived from neighboring blocks adjacent to a current block and the second merge candidate may be set as one of merge candidates derived from non-neighboring blocks non-adjacent to a current block.

In another example, the first merge candidate may be set as one of merge candidates derived from candidate blocks positioned at the top of a current block and the second merge candidate may be set as one of merge candidates derived from candidate blocks positioned at the left of a current block.

In a combined prediction mode in which the above-mentioned merge mode and a merge mode are combined, the merge mode may mean a translation motion model based merge mode (hereinafter, referred to as a translation merge mode) or an affine motion model based merge mode (hereinafter, referred to as an affine merge mode). In other words, motion compensation prediction may be performed by combing a translation merge mode and a translation merge mode or by combining an affine merge mode and an affine merge mode.

In another example, when a neighboring block used to derive the first merge candidate is encoded based on affine motion information, a merge candidate derived from a neighboring block encoded based on affine motion information may be set as the second merge candidate. In one example, when the first merge candidate is an affine merge candidate or that the first merge candidate is derived based on the motion information of a sub-block in a coding block encoded based on an affine motion information, a merge candidate derived based on an affine motion information or the motion information of a sub-block in a coding block encoded based on an affine merge candidate may be selected as the second merge candidate. In this connection, the second merge candidate may include at least one of a merge candidate whose search order is closest to the first merge candidate, a merge candidate having the smallest difference of an index with the first merge candidate, a merge candidate with the smallest index or a merge candidate having the smallest difference of a motion vector with the first merge candidate among merge candidates which satisfy the above condition.

Contrary to the above-mentioned example, when a neighboring block used to derive the first merge candidate is encoded based on translation motion information (namely, non-affine motion information), a merge candidate derived from a neighboring block encoded based on translation motion information may be set as the second merge candidate. In one example, when the first merge candidate is a non-affine merge candidate, a non-affine merge candidate may be selected as the second merge candidate. In this connection, the second merge candidate may include at least one of a merge candidate whose search order is closest to the first merge candidate, a merge candidate having the smallest difference of an index with the first merge candidate, a merge candidate with the smallest index or a merge candidate having the smallest difference of a motion vector with the first merge candidate among non-affine merge candidates.

Alternatively, the second merge candidate may be derived by adding or subtracting an offset to or from the index of the first merge candidate, but when the encoding method of neighboring blocks used to derive the first and second merge candidates are different from each other, the second merge candidate may be replaced by another merge candidate. Only when the number of merge candidates included in a merge candidate list is less than the predefined number, the second merge candidate may be derived by adding or subtracting an offset to or from the first merge candidate. In this connection, the predefined number may be 2, 3, or 4, etc.

FIG. 32 is a diagram to explain an example determining the second merge candidate.

When the first merge candidate is selected, a merge candidate having an index derived by adding or subtracting an offset to or from the index of the first merge candidate may be selected as the second merge candidate. In one example, a merge candidate having a value indicated by merge_idx signaled by a bitstream as an index may be selected as the first merge candidate and a merge candidate having merge_idx+1 as an index may be selected as the second merge candidate.

In this connection, when the first merge candidate is derived from a sub-block belonging to a coding block encoded by an affine merge candidate or an affine motion model, the second merge candidate should be also set as a merge candidate derived from a sub-block belonging to a coding block encoded by an affine merge candidate or an affine motion model. When a merge candidate having merge_idx+1 as an index is not an affine merge candidate or is not derived from a sub-block belonging to a coding block encoded by an affine motion model, another merge candidate may be set as the second merge candidate. In this connection, the other merge candidate may be a merge candidate having the smallest difference of an index with the first merge candidate or with merge_idx+1 among merge candidates derived from a sub-block belonging to a coding block encoded by affine merge candidates or an affine motion model.

On the contrary, when the first merge candidate is a non-affine merge candidate, the second merge candidate should be also set as a non-affine merge candidate. When a merge candidate having merge_idx+1 as an index is derived from a sub-block belonging to a coding block encoded by an affine merge candidate or an affine motion model, another merge candidate may be set as the second merge candidate. In this connection, the other merge candidate may be a merge candidate with the smallest difference of an index with the first merge candidate or with merge_idx+1 among non-affine merge candidates. In one example, an example shown in FIG. 32 illustrated that a merge candidate A3 having merge_idx+2 as an index is set as the second merge candidate.

In another example, motion compensation prediction may be performed by combining a translation merge mode and an affine merge mode. In other words, among the first merge candidate or the second merge candidate, one may be an affine merge candidate and the other may be a non-affine merge candidate.

A combined prediction block may be obtained by the weighted sum operation of the first prediction block derived from the first merge candidate and the second prediction block derived based on the second merge candidate. A weight may be a real number including 0. In this connection, a weight applied to the first prediction block may be set as a value greater than a weight applied to the second prediction block.

Alternatively, based on the motion information of the first merge candidate and the second merge candidate, weights may be determined. In one example, based on the difference of output order between a reference picture and a current picture, weights applied to the first and second prediction block may be determined. Concretely, as the difference of output order between a reference picture and a current picture is greater, a weight applied to a prediction block may be set as a small value.

Alternatively, considering a size or shape of a candidate block used to derive the first merge candidate (hereinafter, referred to as the first candidate block) and a size or shape of a candidate block used to derive the second merge candidate (hereinafter, referred to as the second candidate block), weights applied to the first and second prediction block may be determined. In one example, a weight applied to a prediction block derived from one having a shape similar to a current block among the first candidate block and the second candidate block may be set as a large value. On the other hand, a weight applied to a prediction block derived from one having a shape non-similar to a current block may be set as a small value.

FIG. 33 is a diagram showing an example in which weights applied to prediction blocks are determined based on the shape of candidate blocks.

It is assumed that a current block has a non-square shape whose width is greater than height.

The first prediction block and the second prediction block may be derived based on the first merge candidate and the second merge candidate and a combined prediction block may be generated based on the weighted sum operation of the first prediction block and the second prediction block. In this connection, weights applied to the first prediction block and the second prediction block may be determined based on the shape of the first candidate block and the second candidate block.

In one example, in an example shown in FIG. 33, the first candidate block has a square shape and the second candidate block has a non-square shape whose width is greater than height. As the shape of the second candidate block is identical to a current block, a weight applied to the second prediction block may be set to have a value greater than a weight applied to the first prediction block. In one example, 5/8 weight may be applied to the second prediction block and 3/8 weight may be applied to the first prediction block. The following Equation 7 shows an example deriving a combined prediction block based on the weighted sum operation of the first prediction block and the second prediction block.

$$P(x,y)=(3*P_1(x,y)+5*P_2(x,y))>>3 \qquad \text{[Equation 7]}$$

P(x, y) represents a combined prediction block, $P_1(x, y)$ represents the first prediction block and $P_2(x, y)$ represents the second prediction block.

In another example, based on the shape of a current block, a weight applied to the first and second prediction block may be determined. In one example, when a current block has a non-square shape whose width is greater than height, a larger weight may be applied to a prediction block generated based on a candidate block positioned at the top of the current block among the first merge candidate and the second merge candidate. When both the first merge candidate and the second merge candidate are derived from candidate blocks positioned at the top, a weight applied to the first prediction block may be set to be equal to a weight applied to the second prediction block. On the other hand, when the current block has a non-square shape whose height is greater than width, a larger weight may be applied to a prediction block generated based on a candidate block positioned at the left of a current block among the first merge candidate and the second merge candidate. When both the first merge candidate and the second merge candidate are derived from candidate blocks positioned at the left, a weight applied to the first prediction block may be set to be equal to a weight applied to the second prediction block. When a current block is square, a weight applied to the first prediction block may be set to be equal to a weight applied to the second prediction block.

In another example, based on distance between a current block and a candidate block, a weight applied to each prediction block may be determined. In this connection, distance may be derived based on x-axis coordinate difference with the current block, y-axis coordinate difference with the current block or the minimum value among them. A weight applied to a prediction block derived from a merge candidate with a small distance with the current block may be set to be greater than a weight applied to a prediction block derived from a merge candidate with a large distance with the current block. In one example, in an example shown in FIG. 30, the first merge candidate was derived from a neighboring block adjacent to the current block and the second merge candidate was derived from a non-neighboring block non-adjacent to the current block. In this case, as an x-axis distance between the first candidate block and the current block is smaller than an x-axis distance between the second candidate block and the current block, a weight applied to the first prediction block may be set to be larger than a weight applied to the second prediction block.

Alternatively, when both the first merge candidate and the second merge candidate are derived from non-neighboring blocks, a larger weight may be assigned to a prediction block derived from what is closer to a current block among non-neighboring blocks. In one example, in an example shown in FIG. 32, as a y-axis distance between the first candidate block and the current block is smaller than a y-axis distance between the second candidate block and the current block, a weight applied to the first prediction block may be set to be larger than a weight applied to the second prediction block.

Considering the priority between merge candidates, a weight applied to the first prediction block and the second prediction block may be determined. In this connection, the priority between merge candidates may be determined based on at least one of whether a merge candidate is derived from a spatial neighboring block, whether a merge candidate is derived from a temporal neighboring block, whether a merge candidate is added to a merge candidate list from a motion information table, whether a merge candidate is generated by combining two merge candidates or an index assigned to a merge candidate.

In one example, considering whether the first merge candidate or the second merge candidate is a merge candidate added to a merge candidate list from a motion information table, a weight applied to the first prediction block and the second prediction block may be determined. Concretely, a weight applied to a prediction block derived based on the motion information of a merge candidate derived from a motion information table may be set to be smaller than a weight applied to a prediction block derived based on the motion information of a merge candidate which is not derived therefrom.

In one example, when both the first merge candidate and the second merge candidate are derived from a spatial neighboring block or a temporal neighboring block, a combined prediction block may be derived by applying Equation 7. On the other hand, when while the first merge candidate is derived from a spatial neighboring block or a temporal neighboring block, the second merge candidate is derived from a motion information candidate included in a motion information table, a weight applied to the first prediction block may be set to be greater than a weight applied to the second prediction block. In one example, Equation 8 shows an example in which a weight applied to the first prediction block is greater than a weight applied to the second prediction block.

$$P(x,y)=(5*P_1(x,y)+3*P_2(x,y))>>3 \quad \text{[Equation 8]}$$

Alternatively, as described in an example in FIG. 25, a weight applied to the first prediction block and the second prediction block may be differently set per sub-block.

Alternatively, when a current block is partitioned into a plurality of sub-partitions, a weight applied to the first prediction block and a weight applied to the second prediction block may be set to be set differently per sub-block. In one example, it may be set that while a weight applied to the first prediction block is greater than a weight applied to the second prediction block for the first sub-partition, a weight applied to the second prediction block is greater than a weight applied to the first prediction block for the second sub-partition.

Alternatively, it may be set that for the first sub-partition, a weight applied to the first prediction block is greater than a weight applied to the second prediction block and for the second sub-partition, a weight applied to the second prediction block is greater than a weight applied to the first prediction block, but for a boundary region between the first sub-partition and the second sub-partition, a weight applied to the first prediction block has the same value as a weight applied to the second prediction block. In this connection, the boundary region may include at least one of a sample positioned on a partitioning line partitioning a current block or a sample whose distance with these samples is below the threshold.

Alternatively, it may be set that while a weight applied to the first prediction block is different from a weight applied to the second prediction block for one of the first sub-partition and the second sub-partition, a weight applied to the first prediction block is equal to a weight applied to the second prediction block for the other of the first sub-partition and the second sub-partition.

FIG. 34 is a diagram showing an example in which a weight applied to prediction blocks is set differently per sub-partition.

A shown example showed that a weight applied to the second prediction block is set to be greater than a weight applied to the first prediction block for the first sub-partition and a weight applied to the first prediction block is set to be equal to a weight applied to the second prediction block for the second sub-partition. In one example, a combined prediction block for the first sub-partition may be derived based on the below Equation 9 and a combined prediction block for the second sub-partition may be derived based on the below Equation 10.

$$P(x,y)+(3*P_1(x,y)+5*P_2(x,y))>>3 \quad \text{[Equation 9]}$$

$$P(x,y)=(4*P_1(x,y)+4*P_2(x,y))>>3 \quad \text{[Equation 10]}$$

Unified motion information may be derived by based on the first merge candidate and the second merge candidate and motion compensation prediction on a current block based on unified motion information may be performed. In one example, the motion vector of a current block may be derived based on the average operation or the weighted sum operation of a motion vector between the first merge candidate and the second merge candidate. In this connection, a weight applied to the motion vector of the first merge candidate and a weight applied to the motion vector of the second merge candidate may be determined by the above-mentioned embodiments.

When the first merge candidate is a non-affine merge candidate and the second merge candidate is an affine merge candidate, the motion vector of a current block may be derived by scaling the motion vector of the second merge candidate. Equation 11 represents an example deriving the motion vector of a current block.

$$(mvX, mvY) = (mv0x, mv0y) + ((mv1x, mv1y) >> M) \quad \text{[Equation 11]}$$

In Equation 11, (mvX, mvY) represents the motion vector of a current block, (mv0x, mv0y) represents the motion vector of the first merge candidate and (mv1x, mv1y) represents the motion vector of the second merge candidate. M represents a scaling parameter. M may be predefined in an encoder and a decoder. Alternatively, according to the size of a current block or a candidate block, the value of a scaling parameter M may be determined. In one example, when the width or height of the second candidate block is greater than 32, M may be set to be 3 and otherwise, M may be set to be 2.

The motion information of the first merge candidate or the second merge candidate may be stored as the motion information of a block that a combined prediction mode in which a merge mode and a merge mode are combined is applied. The stored motion information may be used to derive the motion information of a block which will be encoded/decoded later.

Alternatively, the above blocks may be partitioned into a plurality of sub-blocks and any one of the motion information of the first merge candidate or the second candidate may be stored as the motion information of each sub-block. In this connection, the motion information for a part of a plurality of sub-blocks may be set as the motion information of the first merge candidate and the motion information for others may be set as the motion information of the second merge candidate.

Alternatively, unified motion information derived based on the motion information of the first merge candidate and the second merge candidate may be stored as the motion information of a block that a combined prediction mode in which a merge mode and a merge mode are combined is applied.

In a prediction mode in which a merge mode and a motion vector prediction mode are combined, the first prediction block may be generated by using motion information derived from a merge candidate and the second prediction block may be generated by using a motion vector derived from a motion vector prediction candidate.

In a motion vector prediction mode, a motion vector prediction candidate may be derived from a neighboring block adjacent to a current block or from a collocated block in a collocated picture. After that, any one of a plurality of motion vector prediction candidates may be specified and a specified motion vector prediction candidate may be set as a motion vector predictor for the current block. Hereinafter, the motion vector of a current block may be derived by adding the motion vector predictor of a current block and the difference value of a motion vector.

In a prediction mode in which a merge mode and a motion vector prediction mode are combined, a merge candidate and a motion vector prediction candidate may be derived from the same candidate block. In one example, if a merge candidate is specified by merge_idx, the motion vector of a candidate block used to derive the specified merge candidate may be set as a motion vector predictor. Alternatively, if a motion vector prediction candidate is specified by mvp_flag, a merge candidate derived from a candidate block used to derive the specified merge candidate may be selected.

Alternatively, a candidate block used to derive a merge candidate may be different from a candidate block used to derive a motion vector prediction candidate. In one example, if a merge candidate derived from a candidate block positioned at the top of a current block is selected, a motion vector prediction candidate derived from a candidate block positioned at the left of the current block may be set to be selected.

Alternatively, when a merge candidate selected by index information and a motion vector prediction candidate selected by index information are derived from the same candidate block, the motion vector prediction candidate may be replaced with a motion vector prediction candidate derived from a candidate block neighboring the candidate block or the merge candidate may be replaced with a merge candidate derived from a candidate block neighboring the candidate block.

FIG. 35 is a diagram showing an example in which a merge candidate is replaced.

An example shown in FIG. 35 (*a*) showed that a merge candidate and a motion vector prediction candidate derived from a candidate block at a position of A2 were selected. As shown, when a merge candidate and a motion vector prediction candidate are derived from the same candidate block, a merge candidate or a motion vector prediction candidate derived from a candidate block neighboring the candidate block may be used instead of the merge candidate or the motion vector prediction candidate. In one example, as in an example shown in FIG. 35 (*b*), a merge candidate at a position of A1 may be used instead of the merge candidate at a position of A2.

The first prediction block may be derived based on the merge candidate of a current block and the second prediction block may be derived based on a motion vector prediction candidate. Hereinafter, a combined prediction block may be derived by the weighted sum operation of the first prediction block and the second prediction block. In this connection, a weight applied to the second prediction block generated in a motion vector prediction mode may be set to be greater than a weight applied to the first prediction block generated in a merge mode. Alternatively, conversely, a weight applied to the first prediction block generated in a merge mode may be set to be greater than a weight applied to the second prediction block generated in a motion vector prediction mode.

Alternatively, as described in the example of FIG. 25, a weight applied to the first prediction block and the second prediction block may be set differently per sub-block.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

A transform method may be determined on a basis of a block. A transform method may be determined on the basis of at least one of a prediction encoding mode for a current block, a size of the current block, or a size of the current block. In an example, when a current block is encoded through an intra-prediction mode, and a size of the current block is smaller than N×N, transform may be performed by using a transform method of DST. On the other hand, when the above condition is not satisfied, transform may be performed by using a transform method of DCT.

For a partial block of a residual image, two-dimensional image transform may not be performed. Not performing two-dimensional image transform may be referred to as transform skip. When transform skip is applied, quantization may be applied to residual values for which transform is not performed.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DCT7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. In this connection, a transform coefficient for remaining regions for which second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for transform in the horizontal direction and transform in the vertical direction, the second transform may be allowed.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

The decoder may perform inverse-transform (second inverse-transform) to the second transform and may perform inverse-transform (first inverse-transform) to the first transform resultant from the second inverse-transform. As a result of performing the second inverse-transform and the first inverse-transform, residual signals for the current block may be obtained.

When transform and quantization are performed by the encoder, the decoder may obtain the residual block via inverse-quantization and inverse-transform. The decoder may add the prediction block and the residual block to each other to obtain the reconstructed block for the current block.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF).

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes video.

What is claimed is:
1. A method of decoding a video, the method comprising:
determining a prediction mode of a current block;
in response to the prediction mode of the current block representing inter prediction, generating a merge candidate list for the current block, the merge candidate list being generated by adding at least one of a spatial merge candidate and a temporal merge candidate thereto;

in response to a determination that a number of merge candidates included in the merge candidate list is less than a threshold value, updating the merge candidate list by adding a motion information candidate included in a motion information table to the merge candidate list as a new merge candidate; and obtaining motion information of the current block based on the updated merge candidate list, wherein motion information of a spatial block of which a decoding order is earlier than a decoding order of the current block is stored on the motion information table as the motion information candidate, wherein in case that the current block is included in a parallel processing region, a block that is included in the same parallel processing region with the current block is not used to update the motion information table, and wherein a size of the parallel processing region is determined by size information decoded from a bitstream.

2. The method of claim 1, wherein the method further comprises updating the motion information table by adding the motion information of the current block as a new motion information candidate, and wherein in response to a determination that a motion information candidate same as the new motion information candidate is already included in the motion information table, the motion information candidate same as the new information candidate is deleted from the motion information table and then the new motion information candidate is added to the motion information table with a highest index.

3. The method of claim 1, wherein updating the merge candidate list comprises performing a redundancy check of the motion information candidate with merge candidates included in the merge candidate list, and wherein the redundancy check of the motion information candidate is performed only with merge candidates that are derived from blocks at a top neighboring position and a left neighboring position.

4. The method of claim 1, wherein after updating the merge candidate list with the motion information table, the merge candidate list is reupdated by adding a pair-wise merge candidate, and wherein the pair-wise merge candidate is derived by averaging motion vectors of two merge candidates that are already included in the merge candidate list.

5. The method of claim 1, wherein the threshold value is derived by subtracting a pre-defined offset to a maximum number of merge candidates that can be included in the merge candidate list.

6. The method of claim 1, wherein the current block is located at a bottom-right position in the parallel processing region.

7. A method of encoding a video, the method comprising:

in response to a prediction mode of a current block representing inter prediction, generating a merge candidate list for the current block, the merge candidate list being generated by adding at least one of a spatial merge candidate and a temporal merge candidate thereto;

in response to a determination that a number of merge candidates included in the merge candidate list is less than a threshold value, updating the merge candidate list by adding a motion information candidate included in a motion information table to the merge candidate list as a new merge candidate; and obtaining motion information of the current block based on the updated merge candidate list, wherein motion information of a spatial block of which an encoding er is earlier than an encoding order of the current block is stored on the motion information table as the motion information candidate, wherein in case that the current block is included in a parallel processing region, a block that is included in the same parallel processing region with the current block is not used to update the motion information table, and wherein size information indicating a size of the parallel processing region is encoded into a bitstream.

8. The method of claim 7, wherein the method further comprises updating the motion information table by adding the motion information of the current block as a new motion information candidate, and wherein in response to a determination that a motion information candidate same as the new motion information candidate is already included in the motion information table, the motion information candidate same as the new information candidate is deleted from the motion information table and then the new motion information candidate is added to the motion information table with a highest index.

9. The method of claim 7, wherein updating the merge candidate list comprises performing a redundancy check of the motion information candidate with merge candidates included in the merge candidate list, and wherein the redundancy check of the motion information candidate is performed only with merge candidates that are derived from blocks at a top neighboring position and a left neighboring position.

10. The method of claim 7, wherein after updating the merge candidate list with the motion information table, the merge candidate list is re-updated by adding a pair-wise merge candidate, and wherein the pair-wise merge candidate is derived by averaging motion vectors of two merge candidates that are already included in the merge candidate list.

11. The method of claim 7, wherein the threshold value is derived by subtracting a pre-defined offset to a maximum number of merge candidates that can be included in the merge candidate list.

12. The method of claim 7, wherein the current block is located at a bottom-right position in the parallel processing region.

13. A device for storing a compressed video data which being generated by an encoding method, wherein the encoding method comprises:

in response to a prediction mode of a current block representing inter prediction, generating a merge candidate list for the current block, the merge candidate list being generated by adding at least one of a spatial merge candidate and a temporal merge candidate thereto;

in response to a determination that a number of merge candidates included in the merge candidate list is less than a threshold value, updating the merge candidate list by adding a motion information candidate included in a motion information table to the merge candidate list as a new merge candidate; and obtaining motion information of the current block based on the updated merge candidate list, wherein motion information of a spatial block of which an encoding order is earlier than an encoding order of the current block is stored on the motion information table as the motion information candidate, wherein in case that the current block is included in a parallel processing region, a block that is included in the same parallel processing region with the current block is not used to update the motion information table, and wherein size information indicating a size of the parallel processing region is encoded into a bitstream.

* * * * *